(12) United States Patent
Lu et al.

(10) Patent No.: US 10,360,778 B1
(45) Date of Patent: Jul. 23, 2019

(54) RADIO FREQUENCY LOCATING AND MAPPING OF AN ASSET AND A USER IN A SPACE

(71) Applicant: ABL IP HOLDING LLC, Conyers, GA (US)

(72) Inventors: Min-Hao Michael Lu, Castro Valley, CA (US); John England, San Francisco, CA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 15/939,699

(22) Filed: Mar. 29, 2018

(51) Int. Cl.
G08B 13/24 (2006.01)
G06K 17/00 (2006.01)

(52) U.S. Cl.
CPC . G08B 13/2462 (2013.01); G06K 2017/0045 (2013.01)

(58) Field of Classification Search
CPC ...... G06K 2017/0045; G08B 13/2462; H04W 64/00
USPC .......... 340/572.1, 572.4, 573.1, 10.1, 539.11
See application file for complete search history.

(56) References Cited

U.S. PATENT DOCUMENTS

| 7,327,251 | B2 | 2/2008 | Corbett, Jr. | |
| 7,551,089 | B2 | 6/2009 | Sawyer | |
| 7,589,616 | B2 * | 9/2009 | Klatsmanyi | G08B 13/2462 340/10.1 |
| 8,953,570 | B2 * | 2/2015 | Lin | G01S 13/82 340/10.1 |
| 9,536,407 | B2 * | 1/2017 | Todasco | G08B 21/02 |
| 2004/0217864 | A1 * | 11/2004 | Nowak | G06K 17/0022 340/572.1 |
| 2005/0035862 | A1 * | 2/2005 | Wildman | A61B 5/1113 340/573.1 |
| 2011/0001436 | A1 | 1/2011 | Chemel et al. | |
| 2011/0266345 | A1 | 11/2011 | Fowler et al. | |
| 2013/0063317 | A1 | 3/2013 | Jonsson et al. | |
| 2014/0084795 | A1 | 3/2014 | Cumpston et al. | |
| 2014/0375431 | A1 * | 12/2014 | Cristache | G01S 13/876 340/10.1 |
| 2015/0379860 | A1 * | 12/2015 | Vardi | G08B 25/10 340/8.1 |
| 2016/0092704 | A1 | 3/2016 | Russell | |

FOREIGN PATENT DOCUMENTS

WO        2016172236 A1    10/2016

* cited by examiner

Primary Examiner — Eric Blount
(74) Attorney, Agent, or Firm — RatnerPrestia

(57) ABSTRACT

Examples of systems and method track a location of an asset within a space using an asset tag location estimation system, track movement of a selected user, or user's mobile device, using a positioning system, and associate the tracked asset with the selected user, or user's mobile device, based on a determination of a trajectory of the asset and the mobile device. Trajectories of the user/mobile device and the asset tag may be determined by a backend server. The trajectory of the selected user/mobile device and the trajectory of the asset tag are compared by the backend server to determine a correspondence between the respective trajectories based on a predetermined correspondence criteria. The determined correspondence indicates that a user of the corresponding mobile device is moving the asset. In response to the determined correspondence, the backend server associates the asset tag to the selected user/mobile device in a database.

26 Claims, 12 Drawing Sheets

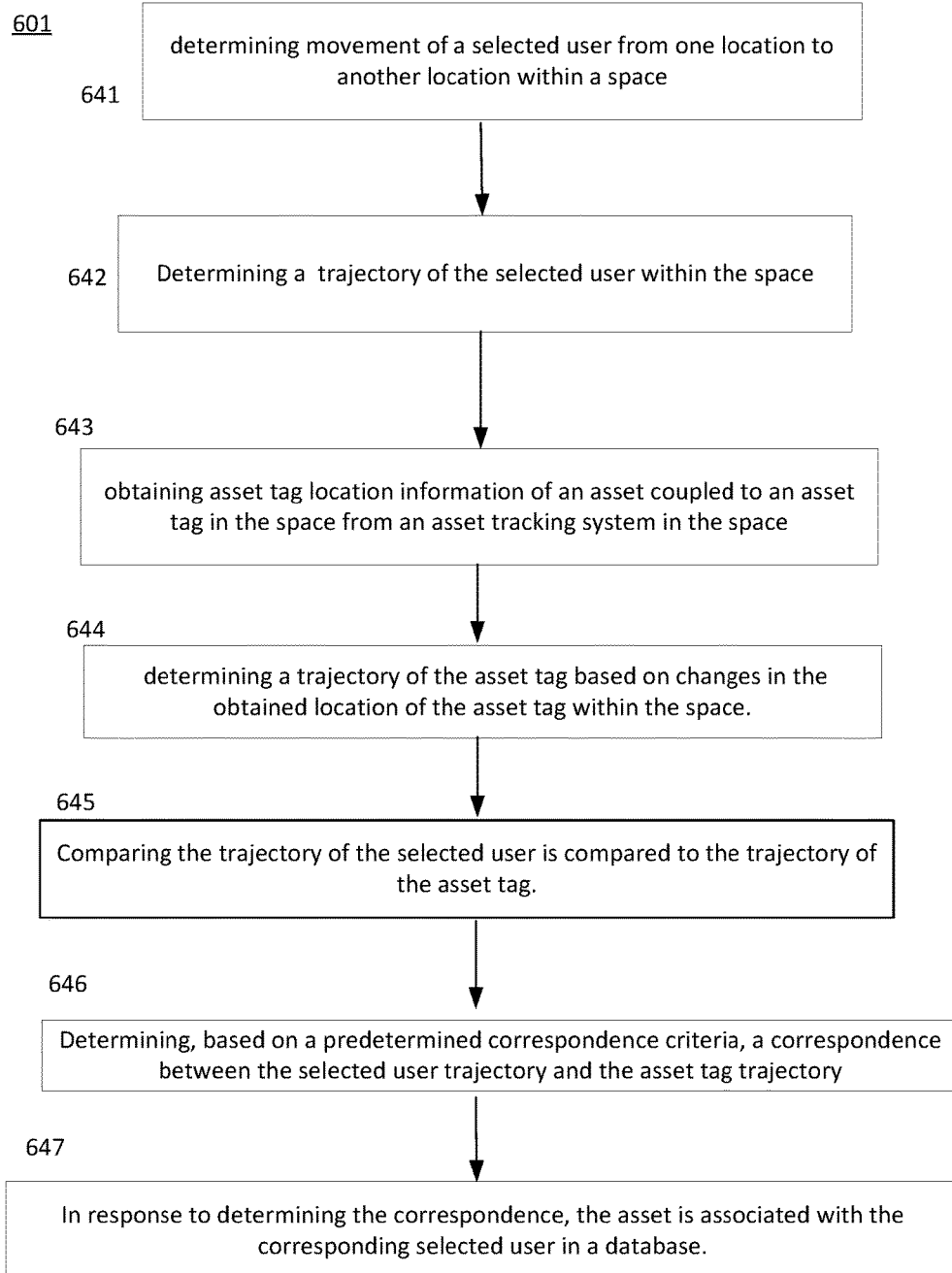

| 681 Record # | 682 System | 683 User | 684 Time | 685 X | 685 Y | 686 Assets Carried |
|---|---|---|---|---|---|---|
| 1 | PS | A | 201704 01 09:00:00 | 10 | 7 | a, b |
| 2 | PS | B | 201704 01 09:00:02 | 12 | 7.5 | |
| 3 | PS | C | 201704 01 09:00:04 | 15.4 | 6.1 | c |
| 4 | PS | D | 201704 01 09:00:06 | 2 | 9 | |
| 5 | PS | A | 201704 01 09:00:08 | 10.5 | 7 | a, b |
| 6 | PS | B | 201704 01 09:00:10 | 14 | 7.5 | |
| 7 | PS | C | 201704 01 09:00:12 | 14.8 | 6 | c |
| 8 | PS | D | 201704 01 09:00:14 | 2 | 8.2 | |

| 691 Record # | 692 System | 693 Asset | 694 Time | 695 x′ | 695 y′ | 696 Moving | 697 Carried by |
|---|---|---|---|---|---|---|---|
| 101 | RFID | a | 201704 01 09:00:01 | 11 | 7.5 | Y | A |
| 102 | RFID | b | 201704 01 09:00:03 | 10.4 | 7.6 | Y | A |
| 103 | RFID | c | 201704 01 09:00:05 | 15 | 6 | Y | C |
| 104 | RFID | a | 201704 01 09:00:07 | 11.4 | 7.4 | Y | A |
| 105 | RFID | b | 201704 01 09:00:09 | 10.6 | 7.5 | Y | A |
| 106 | RFID | c | 201704 01 09:00:11 | 14.5 | 6.2 | Y | C |

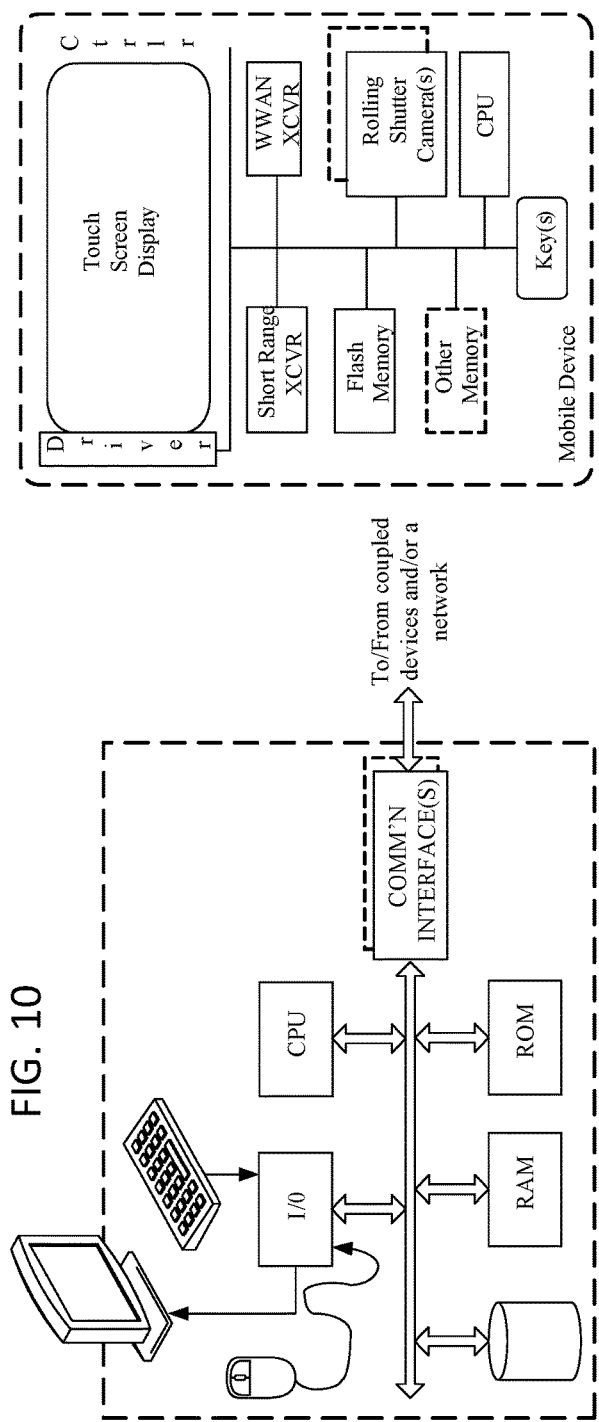
FIG. 10
FIG. 11
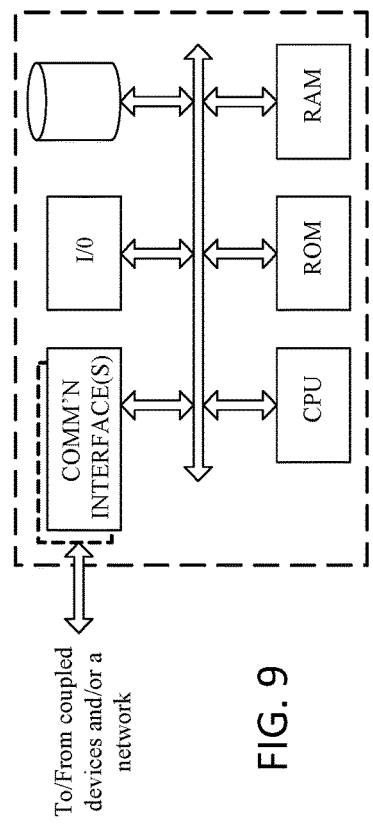
FIG. 9

RADIO FREQUENCY LOCATING AND MAPPING OF AN ASSET AND A USER IN A SPACE

TECHNICAL FIELD

The present subject matter relates to technologies that provide improved tracking of assets within a location and association of a user with the tracked asset within a space.

BACKGROUND

In recent years, the use of wireless communication systems to deliver or exchange data with users' mobile devices, such as smartphones and tablets, within indoor locations have become more prevalent. These wireless communication systems, in addition to delivering data to users' mobile devices, may also provide location determination services that enable the user to determine their location within the space and also enable a system monitoring the space to collect information about the movements of the user through the space. The wireless communication systems may use Wi-Fi, Bluetooth®, or the like to communicate with the respective mobile device.

Asset tracking systems may track assets within an indoor location by using asset tags that are responsive to or emit signals, such as RFID or Bluetooth Low Energy (BLE) signals emitted by and received by antennas coupled to the asset tracking systems. Detectors of the asset tracking system may be located in places within the indoor locations, such as walls, ceilings or other locations where the asset tag is likely to come within communication range of the asset tracking system detector.

Light fixtures within indoor locations are ubiquitous and have become increasingly sophisticated. Lighting fixtures have been equipped with wireless (optical and/or RF) detectors as well as RF receivers and/or transceivers for a number of reasons, such as to control the light sources of the light fixture, provide access to a data communication network, utilize a location determination service for both mobile devices and asset tags, or the like.

The mobile device indoor location determination system and the asset tracking system monitor the location of different objects within the indoor location and present disparate information.

SUMMARY

By way of an example, a system is provided. The system includes a radio frequency-enabled asset tag location estimation system, a positioning system, and a backend server. The asset tag location estimation system is configured to track a location of a radio frequency (RF)-enabled asset tag within a space. The RF-enabled asset tag is coupled to an asset within the space. The positioning system may be configured to determine a location of a selected user within the space. The positioning system is an RF based communication system configured to exchange RF signals with the mobile device of a selected user and determine the location of the mobile device as the location of the user based on the exchanged RF signals. The backend server is coupled to the asset tag location estimation system and the positioning system. The backend server is configured to receive asset tag location information from the asset tag location estimation system corresponding to an RF-enabled asset tag within the space. The backend server may receive user location information from the positioning system, and may determine locations of the RF-enabled asset tag within the space based on the locations of the RF-enabled asset tag provided by the asset tag location estimation system. A trajectory of the RF-enabled asset tag through the space may be determined based on the determined location of the RF-enabled asset tag within the space. The backend server may receive updated user location information of the selected user's mobile device from the positioning system. Based on the received mobile device location information, the backend server may determine an updated trajectory of the selected user through the space. The backend server may determine, based on a predetermined correspondence criteria, a correspondence between the selected user trajectory and the RF-enabled asset tag trajectory. The determined correspondence may indicate that the selected user and the RF-enabled asset tag are traveling through the space within a critical distance of one another. In response to determining the correspondence, the backend server may associate the RF-enabled asset tag to the selected user in a database.

By way of another example, a method is provided that includes determining, in substantially real time by utilizing a positioning system, the movement of a selected user from one location to another location within an space. A trajectory of the selected user within the space is determined based on the determined movement of the selected user. Asset tag location information of an asset coupled to an asset tag in the space is obtained from an asset tag location estimation system in the space, wherein the asset tag location estimation system is communicatively coupled to the asset tag. A trajectory of the asset tag through the space is determined based on a frequency of changes in the obtained location of the asset tag within the space. The trajectory of the selected user may be compared to the trajectory of the asset tag. Based on a predetermined correspondence criteria, a correspondence between the selected user trajectory and the asset tag trajectory is determined. The determination of the correspondence indicates that the user is moving the asset. In response to determining the correspondence, the asset is associated with the selected user in a database.

By way of yet another example, a system including an asset tag location estimation and positioning system including at least one radio frequency (RF) transceiver, and a backend server is provided. The at least one RF transceiver configured for communication with at least one RF-enabled tag. The estimation system is configured to track a location of the asset tag within a space based on receiving RF signals from the RF-enabled asset tag. The estimation and positioning system determines a location of a selected user within the space based on signals obtained from automatically detecting a selected user. The backend server is coupled to the asset tag location estimation and the positioning system. The backend server may be configured to receive asset tag location information from the estimation and positioning system corresponding to the RF-enabled asset tag within the space. The backend server may receive selected user location information from the estimation and positioning system. Based on the asset tag location information provided by the estimation and positioning system, the backend server may determine locations of the RF-enabled asset tag within the space. A trajectory of the RF-enabled asset tag through the space based on the determined locations of the RF-enabled asset tag within the space may be determined. The backend server may receive updated selected user location information from the estimation system. Based on the received selected user location information and the updated received select user location information, the backend server may determine a trajectory of the selected user through the space.

The backend server may determine, based on a predetermined correspondence criteria, a correspondence between the selected user's trajectory and the RF-enabled asset tag trajectory. The determination of a correspondence indicates that the selected user and the RF-enabled asset tag are traveling through the space within a critical distance of one another. In response to determining the correspondence, the backend server may associate the RF-enabled asset tag to the selected user in a database.

Additional objects, advantages and novel features of the examples will be set forth in part in the description that follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present teachings, by way of example only, not by way of limitation. In the figures, like reference numerals refer to the same or similar elements.

FIG. 6B is a flowchart illustrating an example of a method performed by a system as described in FIG. 4.

FIG. 6C illustrates an example of a database entry that combines data inputs obtained from an asset tag location estimate system used to monitor the location of and movement of assets and a positioning system that provides location estimation services with respect to mobile devices within the space.

FIG. 9 is a simplified functional block diagram of a computer that may be configured as a host or server, for example, to function as either of the servers in the system of FIG. 4.

FIG. 10 is a simplified functional block diagram of a personal computer or other work station or terminal device usable for executing location estimation applications and/or receiving location estimation information related to an asset tag.

FIG. 11 is a simplified functional block diagram of a mobile device usable for executing location estimation applications and/or receiving location estimation information related to an asset tag.

DETAILED DESCRIPTION

Figure 1:
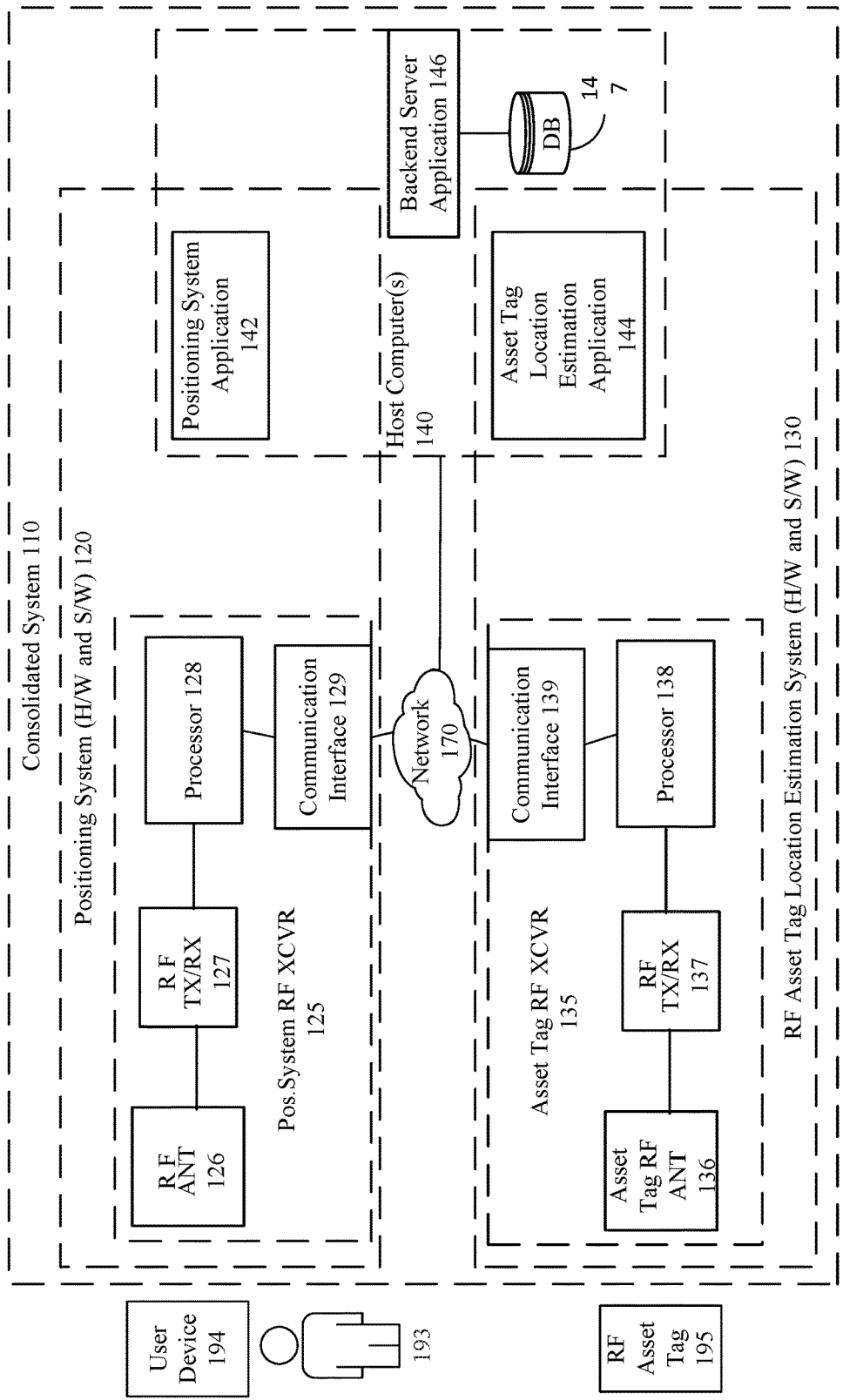
FIG. 1 is a functional block diagram of an example of an overall system for coordinating information from tracking of an asset tag and information from estimating positions of a mobile device.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The term "luminaire" as used herein is intended to encompass essentially any type of device that processes power to generate light, for example, for illumination of a space intended for use of or occupancy or observation. A luminaire, for example, may take the form of a lamp, light fixture or other lighting device that incorporates a light source, such as LEDs or a lamp ("regular light bulbs") of any suitable type. Luminaires, such as light fixtures, floor or table lamps, or other types of lighting devices for artificial general illumination, are widely used in various residential, commercial and industrial settings for providing illumination in both interior and exterior spaces. For example, a retail store may install multiple luminaires in the ceiling for illuminating products and illuminating walking areas throughout the retail store.

The term "node" may refer to an RF-enabled communication device that may provide communication services, e.g. for positioning services, building control system management services and the like. A node may be a connection point in a network that can receive, create, store and/or send data via communication links within the network. Each node is configurable to transmit, receive, recognize, process and originate and/or forward transmissions to other nodes, other devices operating as an access point to a network, or outside the network. The communication services provided by a node may enable networked and non-networked devices, such as asset tags, to send data to a node and receive data from the node. Each node may also be referred to as a "beacon."

Also, an "positioning" system is a system that provides position estimation services and in some cases additional position or location based services over any relatively limited area. The area so served may be partly or entirely confined within a building, ship, mine, or other enclosed structure, but is not necessarily so confined. Hence, a "positioning system" may operate partly or wholly in unenclosed spaces, e.g., over a campus, pedestrian mall, fairground, or the like, where such a service area may also include the interiors of one or more enclosures. Moreover, the spaces or areas served by a single system may not all be contiguous (e.g., the system may distinguish between a number of spaces at somewhat separate locations and support navigation between as well as within those spaces).

Also, an "asset tag location estimation" system is a system configured to provide location estimation services that discover and utilize information about asset tag locations in flat "areas" over which a two-dimensional coordinate system is appropriate (e.g., the floor space of a store or warehouse), the technologies discussed below are also applicable to systems discovering and utilizing information about asset tag locations in three-dimensional spaces. Collection of location estimates for a tag associated with a particular asset over time may allow the system to track the position of the asset within the areas, for example, if the asset is moved within an area.

Although described as two systems, some or all of the components of the positioning system and the asset tag location estimation system may be used in common to provide similar functions for both asset tracking and position estimations relative to a user's mobile device, in the context of an overall estimation system for RF asset tag location and mobile device position estimations.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

In the following examples, an "asset tag" may be a movable RF-enabled device, associated with a specific object, capable of (1) receiving radio signals from network nodes, and (2) broadcasting information to the node network for relay to a back end server. A tag may also have additional capabilities as may be described with reference to the following examples.

The following discussion describes improvements and advantages of a system and method that aggregates the disparate data generated by an positioning system usable to determine position of and track movement of a user and by an asset tag location estimation system, to associate a specific asset within an space with a specific user based on information about the movement of the user within the space. The described examples enable the presentation and processing of aggregated data provided by the positioning service and the asset tag location estimation system to derive information relevant to relationships between respective users and assets.

Reference now is made in detail to the examples illustrated in the accompanying drawings and discussed below.

FIG. 1 is a functional block diagram of an example of a consolidated system for coordinating information from tracking of an asset tag and information from estimating positions of a mobile device over time. The consolidated system 110, also referred to as an asset tag location estimation and positioning system, may include an positioning system 120, a radio frequency (RF)-enabled asset tag location estimation system 130, and one or more host computers 140 that implement a backend server application 146.

The RF asset tag location estimation system 130 may be configured to track a location of a radio frequency (RF)-enabled asset tag, such as 195 within a space (not shown in this example). The RF-enabled asset tag 195 may be coupled to an asset (shown in other examples) within the space. This example of a first RF asset tag location estimation system 130 includes a RF transceiver 135. The RF transceiver 135 may include a processor 138, a RF transmitter (TX)/receiver (RX) 137 and an asset tag RF antenna 136. Details of the RF transceiver 135 and communications with the asset tag 195 are explained with reference to other examples.

The positioning system 120 may be configured to determine a location of a mobile device, such as 194, within the space, for example, by tracking a mobile device the user is carrying. Alternatively, the location of the user may be determined using a camera based system or a radar based system. The positioning system 120 is an RF based communication system configured to exchange RF signals with the user device 194 and determine the location of the user device 194 based on the exchanged RF signals. Details of the positioning system RF transceiver 125 and communications with the user device 194 are explained with reference to other examples.

The host computer(s) 140 implementing backend server application 146 may be coupled via a network 170 and respective communication interfaces 139 and 129 to the asset tag location estimation system transceiver 135 and the positioning system transceiver 125. The backend server application 146 may be configured to receive asset tag location information from the RF asset tag location estimation system 130 corresponding to an RF-enabled asset tag 195 within the space via the communication interface 139 and network 170. The backend server 140 may determine via an asset tag location estimation application 144 locations of the RF-enabled asset tag 195 within the space based on the location information provided by the RF asset tag location estimation system 130. The backend server application 146 may receive mobile device location information from the positioning system 120 via the communication interface 129 and network 170. The backend server 140 may determine via a positioning application 146 locations of the user device 194 within the space based on the location information provided by the positioning system 120. The backend server application 146 may store the mobile device location information provided by positioning system 120 and the asset tag location information provided by RF asset tag location estimation system 130 in database 147.

A trajectory of the RF-enabled asset tag 195 through the space may be determined based on the location determined by the positioning system 120 of the RF-enabled asset tag 195 within the space. The backend server application 146 may receive updated mobile device location information of the selected user's user device 194 that is participating with the positioning system 120 to receive location information. A trajectory of the selected user's user device 194 may be determined through the space based on the received mobile device location information and the received updated mobile device location information.

As described in more detail with reference to the following examples, the backend server 146 may determine, based on a predetermined correspondence criteria, a correspondence between the selected user's mobile device trajectory and the RF-enabled asset tag trajectory. The correspondence indicates that the selected user device 194 and the asset coupled to the RF asset tag 195 are moving together. Upon determining the correspondence, the server application 146 stores an association of the RF-enabled asset tag 195 and/or an associated of the asset to which the tag 195 is coupled, relative to the selected user's mobile device 195, in the database 147.

The backend server application 146, asset tag location estimation application 144, and positioning system application 142 may be programming code that configure the host computer(s) 140 and/or the respective processors 128 and 129 to perform functions as described above and with reference to the following examples.

While the positioning system 120 and the asset tag location estimation system 130 are at times described separately, the positioning system 120 and the asset tag location estimation system 130 may cooperate to function together as part of the consolidated system 110, such a cooperative system may also be referred to as a radio frequency (RF)

asset tag location and mobile device position estimation system. As part of the consolidated system 110, the respective systems 120 and 130 may share hardware and/or software resources as described with reference to the following examples.

Other details of the respective elements of FIG. 1 may be described in more detail with respect to other examples.

Figure 1A:
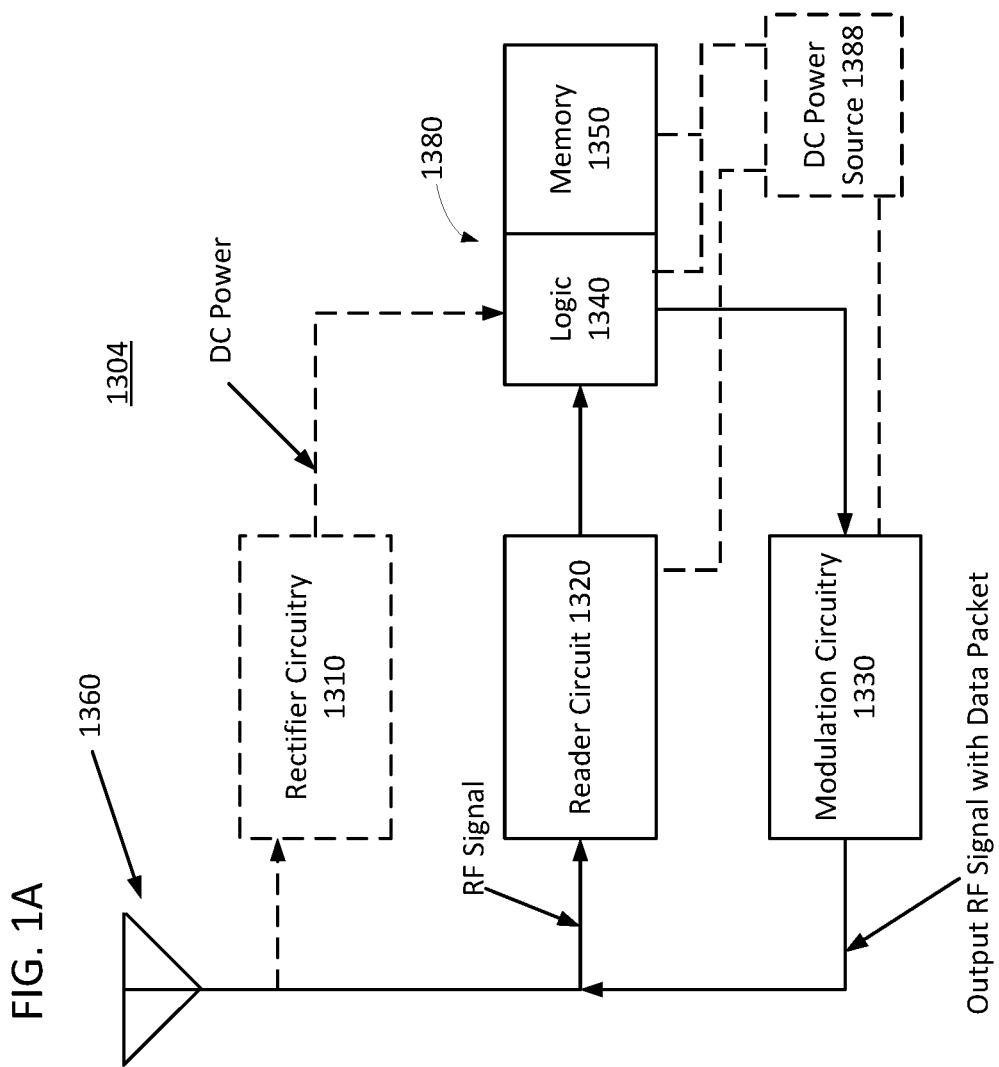
FIG. 1A illustrates a functional block diagram of an example of an asset tag usable with the examples described herein.

For example, the example RF asset tag 195 of FIG. 1 may be described in more detail with reference to the asset tag example of FIG. 1A. FIG. 1A is a functional block diagram of an example of an asset tag usable with the examples described herein. Depending upon whether the asset tag 1304 is an active tag or a passive tag, the asset tag 1304 may have different types of components related to how the asset tag 1304 is powered. For example, in the case in which the asset tag 1304 is an active tag, the power source 1388 may be a dedicated source of power, such as a battery, a solar cell, or the like. Conversely, if the asset tag 1304 is a passive tag, the asset tag will obtain and/or convert energy from sources not dedicated to providing power the asset tag 1304 for use to perform functions. For example, the passive tag may use the energy of a received signal to provide power via circuitry, such as rectifying circuit 1310, to generate power either for immediately powering the logic circuitry 1340 or for later use by storing the energy using capacitors or the like.

Radio frequency signal transmissions from one or more nodes as described in the following examples may be received by one or more tags 1304. When configured as a passive tag, asset tag 1304 includes an antenna 1360, rectifier circuitry (e.g., a capacitor, diodes or the like) 1310, reader circuitry 1320, an information processing circuitry 1380, and a modulation circuit 1330.

The tag antenna 1360 is capable of both receiving radio frequency (RF) signals and of transmitting radio frequency signals. For example, the RF signals transmitted and received by the tag 1304 may be radio-frequency identification (RFID), Bluetooth, Zigbee, or the like, that may be processed according to the appropriate communication protocols. While reference is made in the examples to RFID components and signals, the RF signals transmitted, received and processed in the examples are not intended to limited to RFID components and signals. When the antenna 1360 receives RF signals some of the energy in the RF signals is converted by the rectifier circuitry 1310 into direct current (DC) power. In the case of a passive tag configuration to tag 1304, if the received signal has sufficient signal strength, the converted DC power is sufficient to supply power to the other components of the tag 1304. For example, with sufficient DC power, the information processing circuitry 1380 may be powered for some interval. The received signal is also input to the reader circuit 1320 which may be configured to process the input signal and output data representative of the incoming message. The information processing circuitry 1380 may include logic circuitry (or simply "logic") 1340 and a memory 1350. The memory 1350 may store an address of the tag 1304 and other information related to the tag 1304. The logic 1340 of information processing circuitry 1380 may be configured to perform functions that include the processing of signals received through the antenna 1360 utilizing the logic circuitry 1340 and transmitting information (e.g., a unique identifier of the node that transmitted the received signal) through the antenna 1360.

Functions performed by the information processing circuitry 1380 may include, for example, determining a received signal strength of a signal received from a node and obtaining a respective transmitting node identifier from each of three of the respective received radio signals having strongest measured received signal strengths. The obtaining function may include extracting an identifier of the transmitting node from the received signal. This information may be stored in memory 1350 of the asset tag 1304. The logic 1340 may be configured to retrieve a stored node identifier from the memory 1350, and to generate a data packet that includes the tag address and the node identifier of the node that transmitted the received signal. The generated data packet may be forwarded to the modulation circuitry 1330, and be transmitted from the tag 1304 via the antenna 1360.

In addition, the information processing circuitry 1380 may be configured to measure a received signal strength (RSS) of a signal transmitted by a node. The measured RSS may have, or may be converted into, an RSS indicator (RSSI) value as will be described in more detail with reference to other examples. The RSS measurement capabilities of the logic 1340 may be available to a passive tag implementation as well as an active tag implementation.

If more processing capabilities are needed, the tag 1304 may be configured to receive DC power from a DC power source 1388 in which case the tag 1304 operates as an active tag. When implemented as an active tag, the tag 1304 may include antenna 1360, DC power source 1388, reader circuit 1320, information processing circuitry 1380, and modulation circuitry 1330. The active asset tag 1304 receives sufficient power form the DC power source 1388 to enable operation of the reader circuit 1320, the modulation circuitry 1330, the logic 1340 and the memory 1350. The tag 1304 when implemented as an active tag may be configured to perform functions such as those described with reference to the examples of FIGS. 2-8.

In some examples, the tag 1304 may be coupled to an asset, which may be any asset being tracked by an RFID system (not shown in this example), and a customer or a user may be any person being tracked by the PS (e.g. could be an associate).

Figure 2:
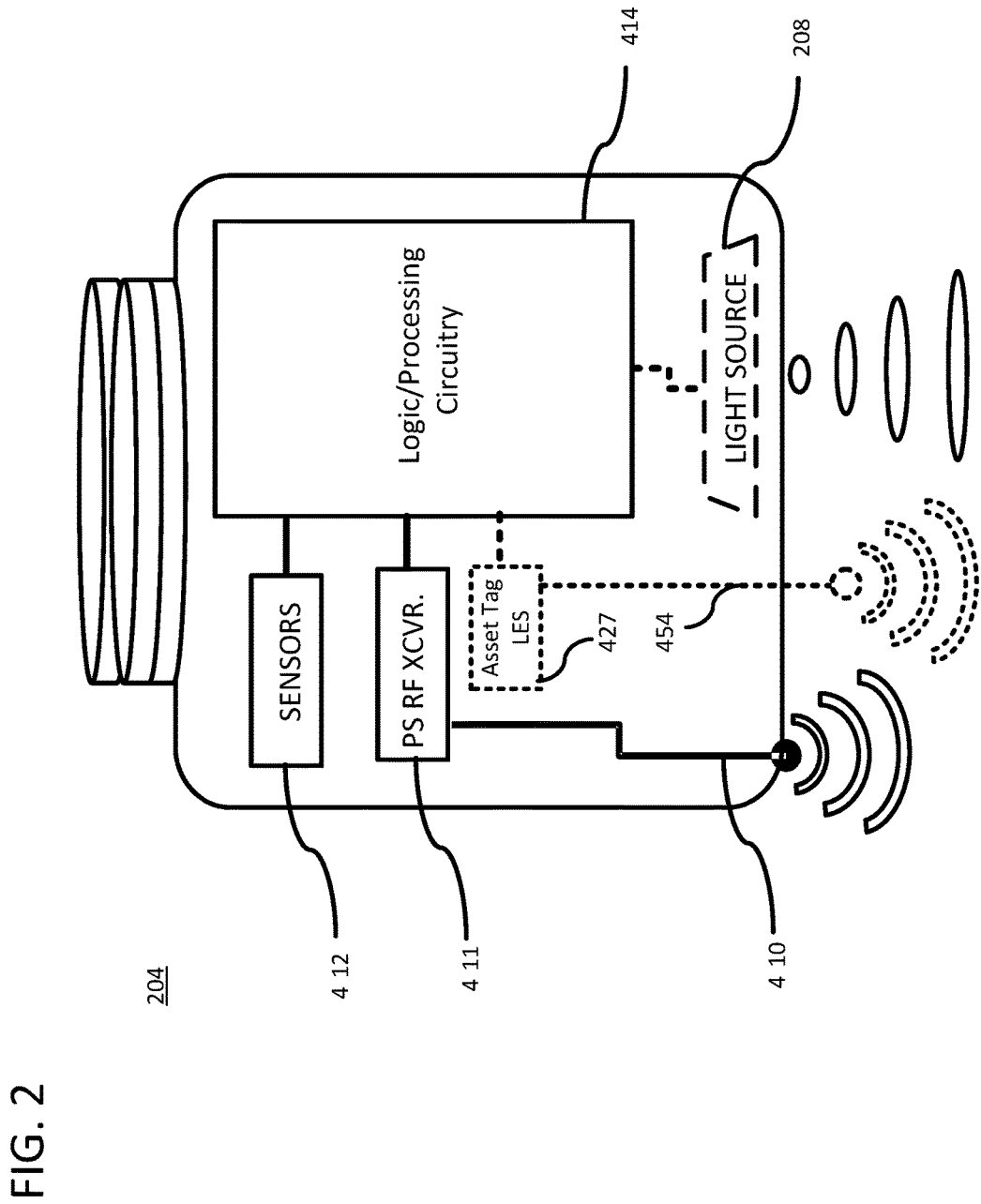
FIG. 2 is a simplified functional block diagram of an RF enabled lighting device.
Figure 3:
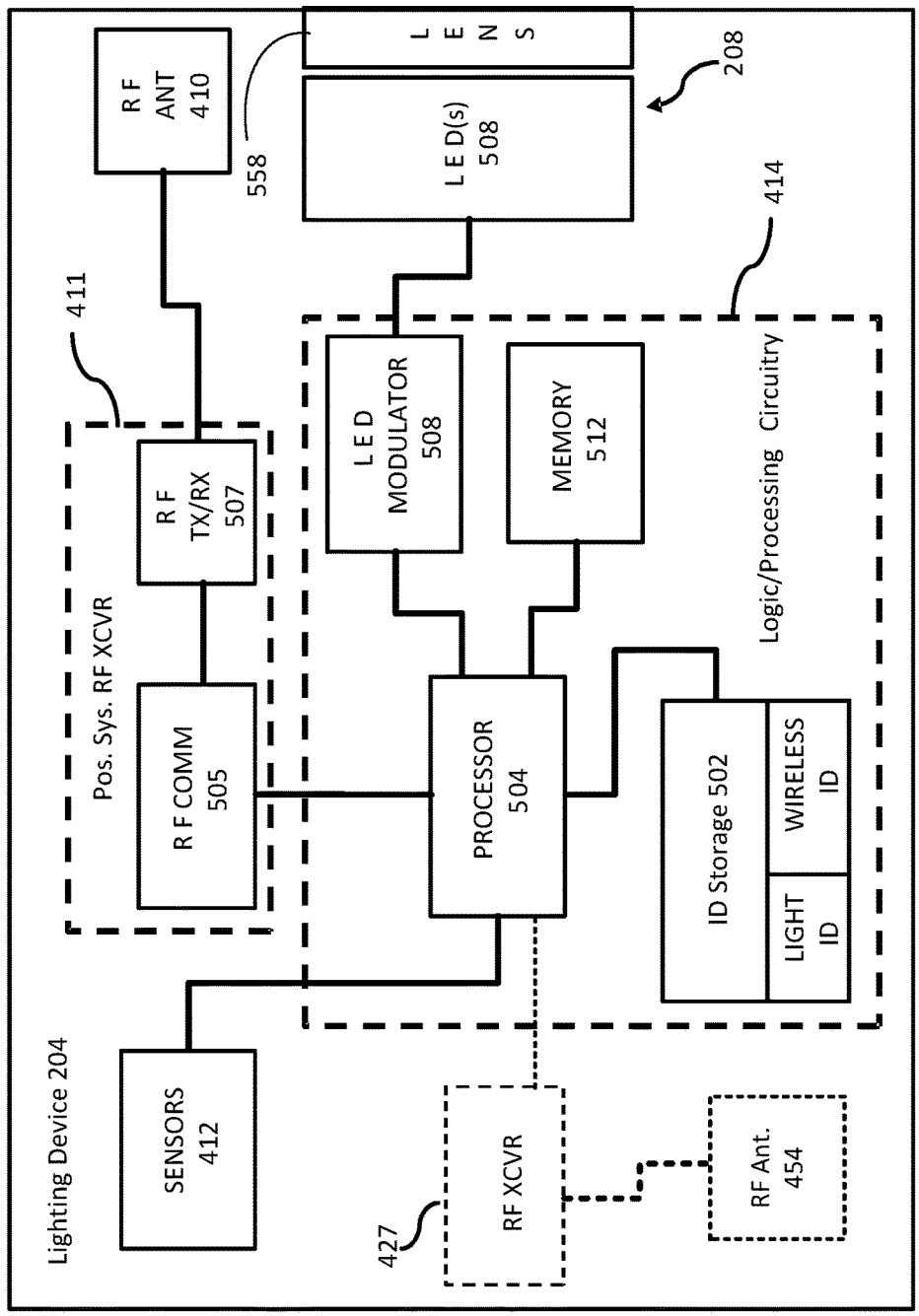
FIG. 3 depicts a more detailed example of an RF enabled lighting device such as that of FIG. 2.

FIG. 2 is a somewhat schematic illustration and a somewhat block diagram type representation of one of the lighting fixtures or luminaires 204; and FIG. 3 is a somewhat more detailed functional block diagram showing possible implementations of several elements of the example of the lighting device 204 of FIG. 2. Reference numbers used in common in both of these drawings refer to the same items. For convenience, the description of these examples will refer to both drawings together, unless otherwise noted.

The example of a lighting fixture or luminaire 204 in FIGS. 2 and 3 includes logic and/or processing circuitry 414 to drive and control operations of a light source 208 and control operations of other elements of the device 204. The light source 208 may be any suitable device capable of generating light in response to power that can be modulated. In the example of FIG. 3, one or more light emitting diodes (LEDs) 508 form the light source 208. The device 204 may include an optical processing element coupled to process the light output from the LEDs 508 that form the light source 208. Although other optical processing elements may be used, such as diffusers, reflectors and the like, the example of FIG. 3 shows a lens 558.

The logic and/or processing circuitry 414 may include elements such as a processor 504, a modulator (i.e. LED modulator 506 in the example of FIG. 3) to supply and modulate power to the light source 208, and a memory 512 as a storage device for programming and data.

Although purpose built logic circuitry could be used, the processor 504 typically is implemented by a programmable device such as a microprocessor or a microcontroller, configured to execute programs and process data that facilitate modulation of light from one or more LEDs 508. The ID storage 502 and memory 512 may be implemented as separate circuit elements coupled to/accessible by the processor 504, e.g. if the processor is a microprocessor type device. A microcontroller typically is a 'system on a chip' that includes a central processing unit (CPU) and internal storage; therefore, a microcontroller implementation might incorporate the processor 504, ID storage 502 and memory 512 within the microcontroller chip.

The processor 504 controls the LED modulator 506 to vary the power applied to drive the LEDs 508 to emit light. This control capability may allow control of intensity and/or color characteristics of illumination that the light source 208 provides as output of the lighting device 204. Of note for purposes of discussion of position system operations, this control capability causes the modulator 506 to vary the power applied to drive the LEDs 508 to cause code modulation of light output of the light output of the light source 208, including modulation to carry a currently assigned lighting device ID code from the secure storage 502. The processor and/or modulator may be configured to implement any of a variety of different light modulation techniques.

As noted, the lighting devices 204 in our examples utilize wireless links to communicate, although other communication media and technologies may be adapted to carry communications discussed herein to and/or from the RF-enabled lighting devices 204. Hence, the wireless examples of FIGS. 2 and 3 may include a positioning system radio frequency (RF) wireless transceiver (XCVR) 411. The RF XCVR 411 may serve dual purposes of enabling RF communications with other RF-enabled lighting devices or networks, and positioning determinations of users and user devices, such as mobile devices and/or RF-enabled user-wearable devices, such as RF-enabled badges or RF-enabled portable devices. For example, the RF communication capability provided by RF XCVR 411 and the antenna 410 supports the various data communications of the lighting device 204. The radio frequency identification (RFID) XCVR 427 of the asset tag location estimation system may be coupled to the logic and/or processing circuitry 414. In addition, the RF communication capability offered by RF XCVR 411 and the antenna 410 may also enable the processor 504 to provide inputs to the positioning system for tracking and identifying users, such as 193 of FIG. 1. The processor 504 may also be equipped to provide information obtained from sensors 412 to a back end server application, such as 146, enabling the positioning system to track user's positions within the space. For example, sensors 412 may be optical sensors that receive optical data, image sensors that collect images of an space that may be image processed by the processor 504, or the like. Identifying users may be done anonymously (e.g., the user is temporarily assigned an identifier while in the indoor location or the like) unless a user opts to be identified in the database. For example, the user may opt into being tracked by utilizing an affinity or rewards application associated with the space. The backend server, another server or a cloud service may manage the user identifications, opt-in/opt-out requests, identifier assignments and the like, for example.

The RF transceiver 411 of FIG. 3 may conform to any appropriate RF wireless data communication standard such as wireless Ethernet (commonly referred to as Wi-Fi), Bluetooth, or Zigbee. In the example, the RF transceiver 411 is a Bluetooth wireless transceiver, more specifically conforming to the Bluetooth Low Energy (BLE) standard. At a still relatively high level, the BLE transceiver 411 may include RF communication circuitry 505 coupled to the processor 504 and RF transmit (TX) and receive (RX) physical layer circuitry 507 coupled to the RF transmit/receive antenna 410.

The RF transceiver 427 of FIG. 3 may conform to any appropriate RFID wireless data communication standard. In the example, the RFID transceiver 427 is an RFID compatible device. At a still relatively high level, the RFID transceiver 427 may include RF communication circuitry coupled to a processor and coupled to an RF transmit/receive antenna 454.

When the lighting device 204 is configured to include the RFID transceiver 427, the RFID antenna 454 and the positioning system RF transceiver 411 with RF antenna 410, the functions performed by the respective transceivers 411, 427 and other components, such as processor 504, memory 512 of the lighting device 204 may be controlled either by the consolidated system 110 of FIG. 1, or by the respective asset tag location estimation system 130 or the positioning system 120.

Figure 4:
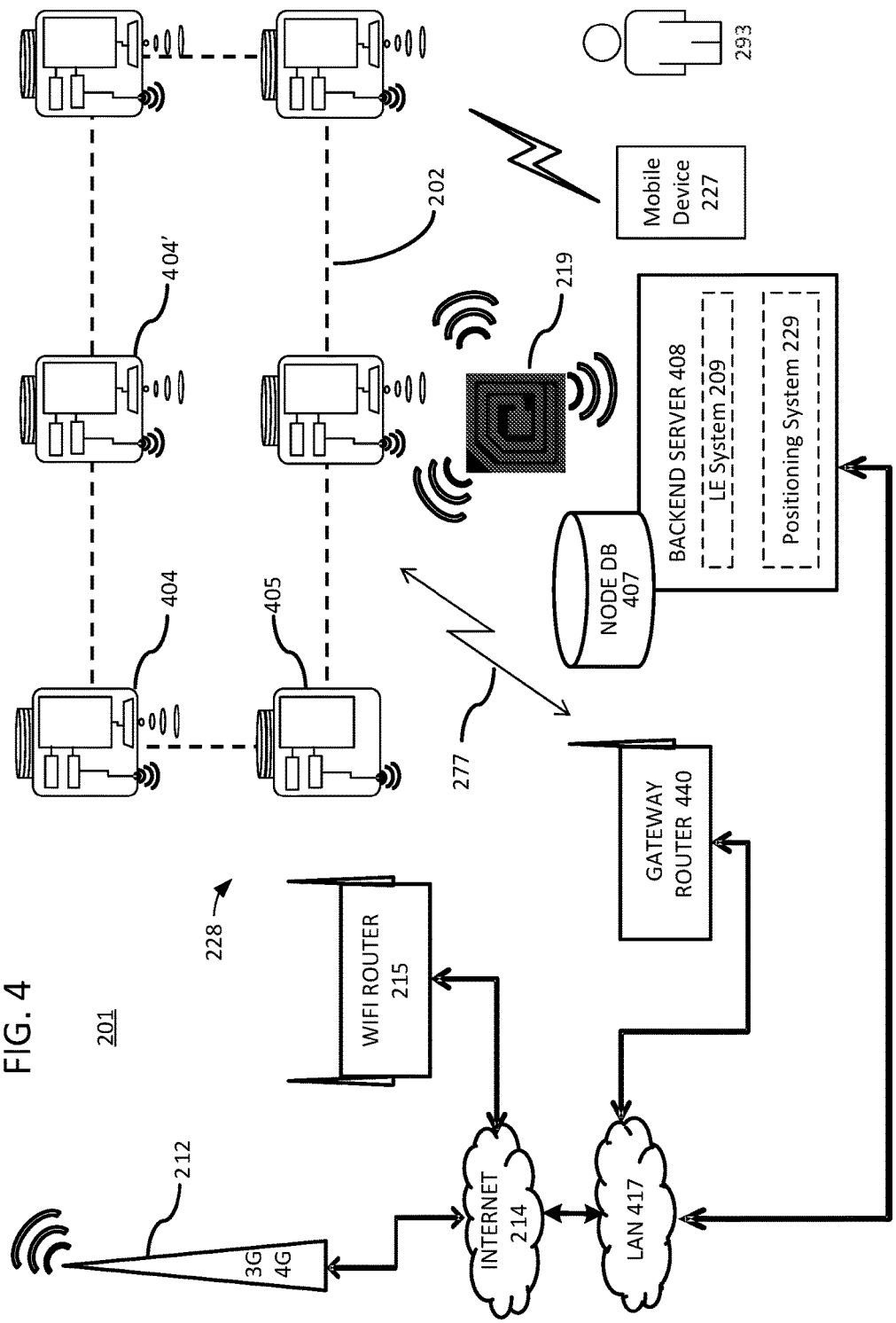
FIG. 4 illustrates a system example of lighting devices and network connected resources, such as a radio-frequency equipped network node and luminaires that support a light-based positioning service for one or more asset tags, such as the asset tag of FIG. 1.

FIG. 4 shows a lighting and positioning system and components in communication with such a lighting and positioning system 401. The lighting fixtures or luminaires 404 and 404' may have the capability to modulate output of the light sources thereof, e.g. for visual light communication (VLC) such as for position related operations. The lighting and positioning system includes the actual lighting fixtures or luminaires 404 and other resources such as servers 408 and database 407 that interact with the lighting fixtures or luminaires 404, 404' for asset tag location estimation and/or other position-related functions.

The lighting fixtures or luminaires 404, 404' and 405, 405' in the examples include wireless transceivers, such as radio-frequency transceivers, for various wireless communication and/or positioning functions. For some communication and networking functions the lighting fixtures or luminaires 404 may be coupled to one another via cable or optical fibers communication resources. In the overall system 401 shown in FIG. 4, an asset tag 419 or the like communicates with one or more of the RF enabled lighting fixtures or luminaires 404 or 405, 405' over a short range RF wireless link, for example, to implement communication aspects of a positioning system. In the overall system 401, the RF enabled lighting fixtures or luminaires 404 or 405, 405' may form an ad hoc mesh-type network 402 and may provide position information usable to determine the position of tag 419 to a gateway router 440, to implement location estimation or location determination functions.

In the system 401, the asset tag 419 communicates with the one or more RF enabled lighting fixtures or luminaires 204 or 205, 205' within the ad hoc mesh-type network 202. As noted, the networked system 201 of FIG. 4 implements a wireless, such as Bluetooth or the like, ad hoc network 202 formed by the wireless-enabled lighting fixtures or luminaires 204. Assuming that the ad hoc network 202 has a link to a compatible wireless gateway router such as 440, then the ad hoc network 202 and the gateway router 440 may offer a data communication path for the asset tag 219, including for data communications related to the positioning and location based services.

The configuration of RF enabled lighting fixtures or luminaires 404 arranged in an ad hoc mesh-type network 402 and connected to Internet 214 resources through, for example, a nearby gateway router 440 and/or Wi-Fi router 215. Lighting fixtures or luminaires 404 may be configured so that an RF signal emitted from the RF transceiver, such as 507 of FIG. 3, of each lighting fixture or luminaire 404 may be distinguished from RF signals output by other nearby RF-enabled lighting fixtures or luminaires 404'. The transceiver 411 in turn is coupled to an RF transmit/receive antenna 410 that may facilitate communication over wireless RF signals to and/or from other similarly equipped proximal devices, such as other lighting devices 204, mobile devices 227, wireless gateway router 440 or other wireless routers or relays, wireless enabled computing devices generally, RF equipped items such as appliances, tools, entertainment devices, RF tags, RF enabled network access points, multi-radio devices, and the like. The mobile devices 227 may be an example of user device 194 of FIG. 1. Other examples of a user device 194 of FIG. 1 may include RF-enabled and non-RF-enabled, user-wearable badges or clothing, portable devices, or the like. Users 293 or 193 of FIG. 1 may also be present. In an example, a position of the user device 194 may be considered the position of the user 193, and vice versa. The association of an asset tag or an asset to a respective user device 194 may in the examples also be referred to interchangeably as an association of the asset tag or asset to the respective user 193 of the user device 194.

A network capability as depicted in FIG. 4 may include access through a mobile device or other RF enabled device to external (non-mesh) networks. A network-network gateway 440 in close proximity to one of the networked lighting devices 404 may enable communication from at least one of the lighting devices and thus the network 202 through any suitable wireless networking link such as Ethernet, Wi-Fi, Zigbee, and the like.

In the example of FIG. 4, the RF-enabled lighting devices in the network 402 may access via a gateway such as gateway router 440, a local area network (LAN) 417 resource, such as a backend server 408, to communicate to networked lighting devices 404 or 404' by passing data through the Internet 414. This may allow communication of information collected from asset tags, such as 419, via the RF capability (e.g., identities of asset tags) by one of the lighting devices to a remote server, such as server 408.

In various examples, the backend server 408 may be a general-purpose mesh server and controller (back end) specially configured to perform functions other than or additional to position determination, issuing commands to the RF and/or lighting capabilities of one or many network nodes, polling network nodes for information garnered from sensors, and so on. The tag location estimating system application 409 may be special programming stored in a memory that is accessible and executable by a general purpose computing device, such as backend server 408. A general-purpose back end may be specially configured to understand the locations, movements, and other aspects of asset tag 419, networked lighting devices 404 or 404' and other asset tags within the service area of the network 402.

Illustrative capabilities include RF asset tag location tracking, robot and drone tracking, routine customer assistance, emergency assistance, and more. In another example, routine scan (advertising) packet broadcasts from Bluetooth-capable mobile devices are detected by the RF capability of nodes, enabling a mode of position estimation of the asset tag 419 based on received signal strength (RSS) indication and/or node detection pattern. Such estimates may be combined with estimates based on detection of VLC beacons by a light-sensing capability of the mobile device, e.g., after the device user is prompted to expose their device to light based on detection of their presence by the RF mode.

As shown in FIG. 4, the location estimation functionality or application 409 may be implemented on backend server 408 or as additional programming on the same computer implementing the gateway router 440. Alternatively, the tag location estimation application 409 of backend server 408 may be implemented on a separate network connected computer platform. For example, the location estimating functionality/application 409 of FIG. 4 may be special programming stored in a memory, e.g., node database 407 of FIG. 4 or other memory, which is executable by a general purpose computing device, such as backend server 408. In addition or alternatively, aspects of the tag location estimating application 409 may be executed by the gateway router 440. The server 408 functionality may be implemented in a distributed fashion on multiple network connected computers, e.g. to adequately serve a particular traffic load and/or to provide some level of redundant capacity for peak load or for use in the event of a failure of a primary server resource. The node database 407 may be implemented in a storage device of the computer(s) that implements the server 408, or the node database 407 may be implemented in a network connected storage device accessible to the appropriate server computer(s).

Locations of asset tags in an area served by a network of RF enabled lighting devices having known locations can be estimated using various techniques. For example, an RSS measured by an asset tag is a proxy for node-to-tag distance (assuming that all nodes transmit signals of equal strength): the farther away the transmitting node, the lower the RSS, and the closer the transmitting node, the higher the RSS. As a result, the RSS measurements without more provide enough information usable for position estimation.

It may be helpful at this time to describe a system example with respect to FIG. 4. The network 401 of FIG. 4 may include radio frequency-enabled nodes, such as 404 and 405, 405', and an asset tag, such as 419, within a space. The system 401 may also include a server, such as 408, that may or may not be located within the space in which the radio frequency-enabled lighting fixtures or luminaires 404, 405, 405' and asset tag 419 are located. The nodes may be arranged in a network 402. Each of the lighting fixtures or luminaires 404 or 405, 405' may be configured to emit a radio frequency signal that includes a node identifier uniquely identifying the radio frequency-enabled node that transmitted the signal from other nodes in the network 402. The server 408 may be coupled to a database, such as 407, that stores the unique node identifier in association with a specific node location in the space. The server 408 may also be coupled via a radio frequency communication data link, such as 477, provided by one of the nodes to the asset tag 419. In an example, the server 408 may be configured, upon execution of programming code to perform functions including functions to receive a tuple (described in more detail with reference to other examples) forwarded from the asset tag, and estimate a location of the asset tag with respect to the specific node locations of the three obtained node identifiers. The server 408 may perform the estimate based on the forwarded tuple and the specific node locations associated with the obtained transmitting node identifiers.

The asset tag 419 may be configured, for example, similar to the tag 1304 of FIG. 1, and may include logic circuitry 1340, a memory, such as 1350, radio frequency receiver circuitry, such as reader circuitry 1320, and radio frequency transmitter circuitry, such as modulation circuitry 1330, all of which are coupled to the logic circuitry 1340 as shown in FIG. 1.

The logic circuitry of the asset tag 419 may be configure the asset tag to perform functions such as those described in the example related to FIGS. 6A-8 Similarly, the server 408 in the system 401 is also configured to perform functions such as those described with reference to FIGS. 6A-8.

The positioning system (PS) such as 229 implemented on the backend server 408 may, for example, determine location information for a number of mobile devices including a mobile device of a selected user within an indoor location. The asset tracking location estimation (LE) system 209 implemented on backend server 408 may provide location information for a number of asset tags within the space. The backend server may obtain mobile device location information from the PS and location estimates of the asset tags in the space from the asset tracking location estimation system. Note that there may be a large number of asset tags, such as thousands or hundreds of thousands of asset tags within a space that are being tracked by the asset tracking location estimation system, and there may be hundreds or thousands of mobile devices within the space that utilize the positioning service. However, for ease of discussion, a single mobile device and a single asset tag will be used in the description of the processes described with respect to FIGS. 6A-8.

Figure 5:
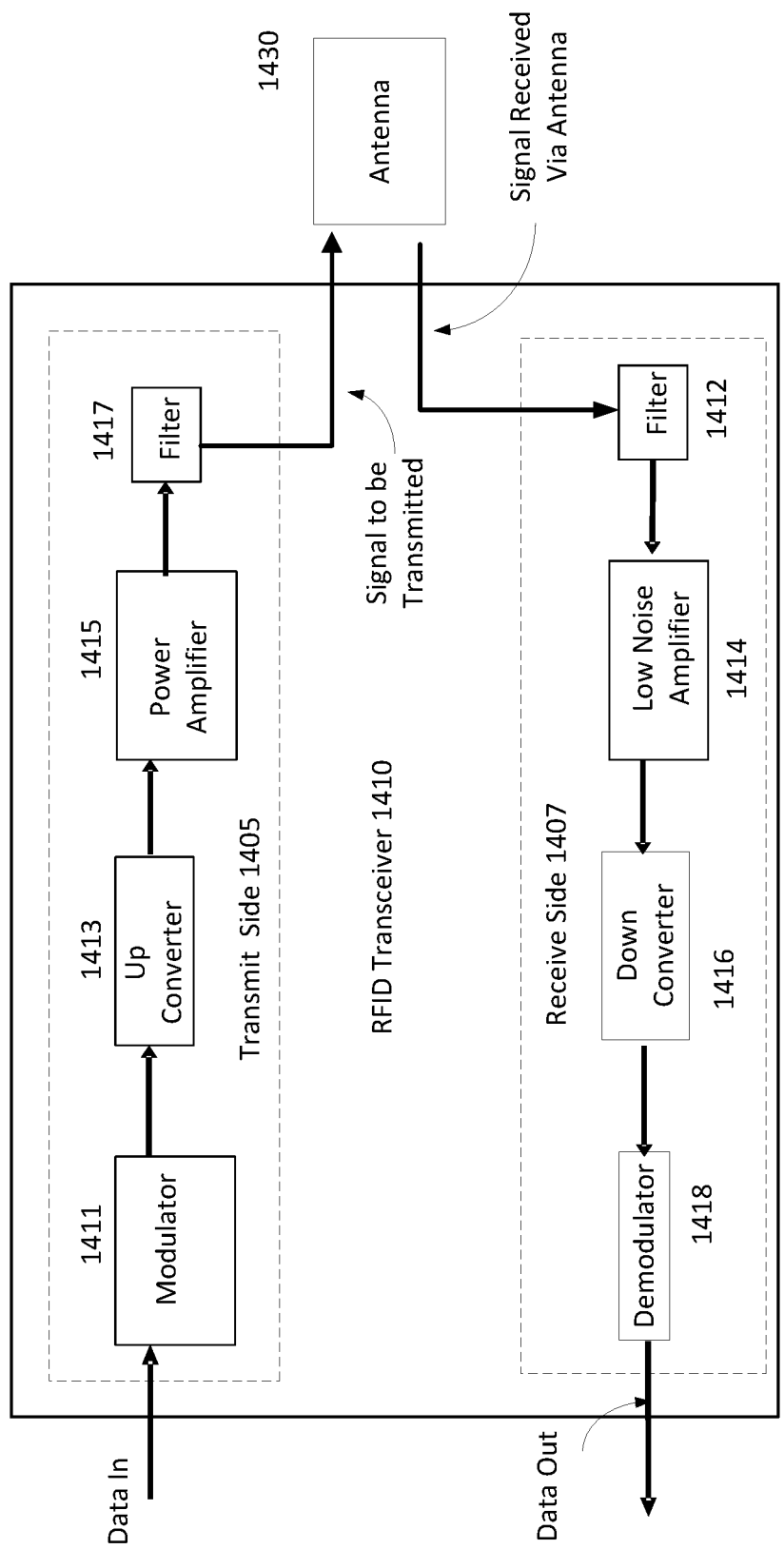
FIG. 5 illustrates an example of a RFID transceiver usable for tracking an asset tag, such as the asset tag of FIG. 1.

Reference is now made to FIG. 5, which schematically depicts an example of an RFID schematic a reader processor configured to control operation of a radio frequency identification reader usable in the system of FIG. 4.

The reader radio frequency transceiver 1410, for example, may be coupled to a reader processor (not shown in this example). The reader radio frequency transceiver 1410 may include a transmit side 1405 and a receive side 1407. The data input to the transmit side 1405 of the RFID transceiver 1410 may be packet data representing the incoming message and/or related information. The RFID transceiver 1410 is configured to emit a signal representing the incoming message and/or related information via the antenna 1430. The transmit side 1405 may include a modulator 1411, an up converter 1413, a power amplifier 1415, a transmit filter 1417. The transmit filter 1417 may be coupled to the antenna interface 1420 to deliver the RF signals for transmission from the antenna 1430.

The RFID transceiver 1410 is configured to receive via the antenna 1430 reply messages in response to the signal emitted by the RFID transceiver 141. The received reply message may be in the form of a signal representing an address of the RFID device the transmitted the received reply message. The receive side 1407 may include a receive filter 1412, a low noise amplifier 1414, a down converter 1416 and a demodulator 1418. The respective components 1411-1418 may perform signal processing functions according to their respective labels. For example, the modulator 1411 may modulates the input data "Data In", and the power amplifier 1415 amplifies the signal output from the up converter 1413. In addition, the RFID transceiver 1410 may be configured to receive reply messages in response to the emitted signal encompassing the input data. The received signal may be filtered by the filter 1412, the low noise amplifier 1414 amplifies the low power signal output from filter 1412, and the demodulator 1418 demodulates the down converted signal output from the down converter 1416. The data output from the demodulator 1418 of the receive side 1407 may be data representative of the reply message transmitted by an asset tag. The data may be forwarded to the asset tag location estimation service for use in estimating a location of the asset tag.

Examples of the processes performed by the hardware and programming functions described with respect to the foregoing examples will now be described in more detail with reference to FIGS. 6A-8.

Figure 6A:
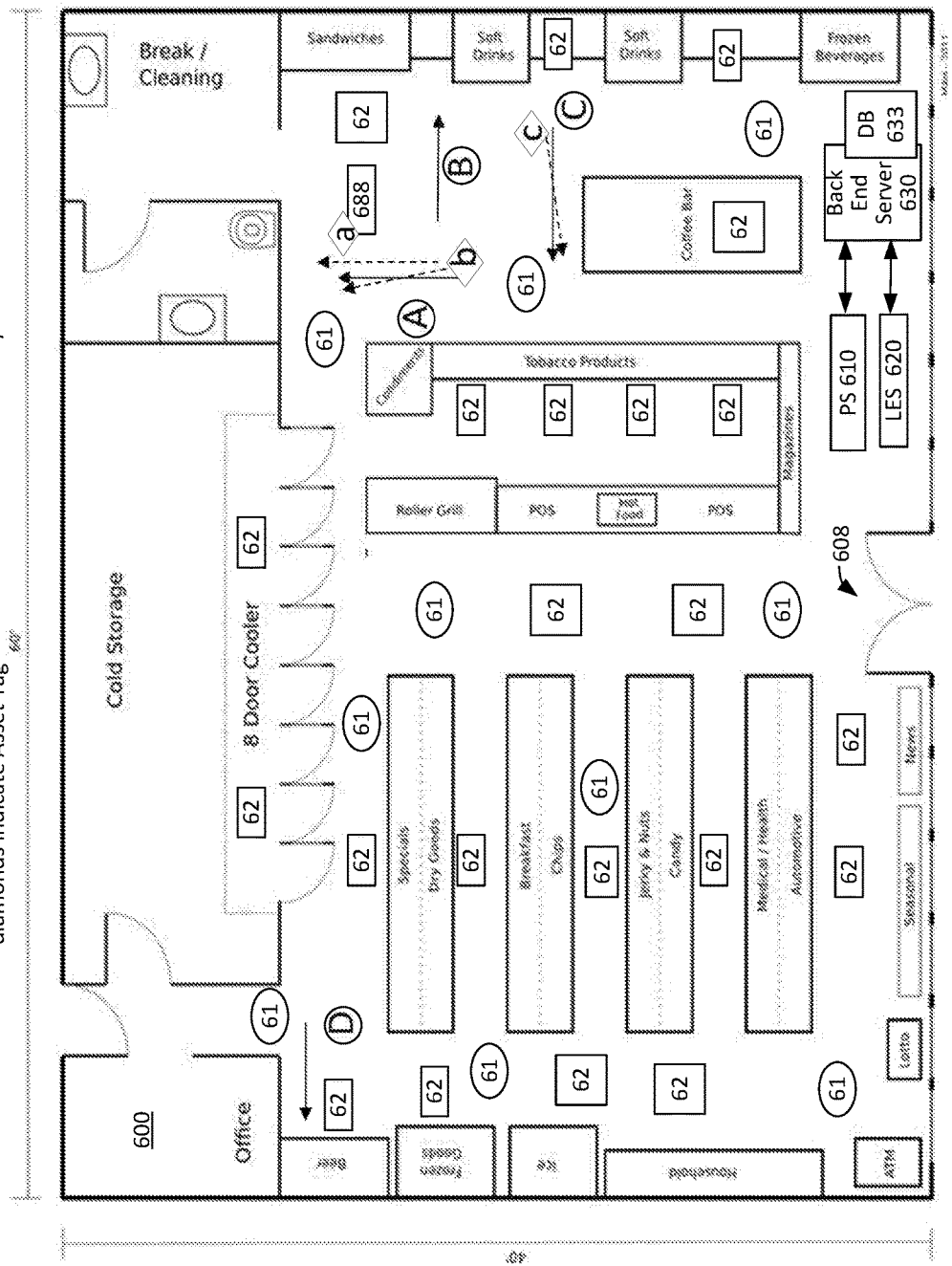
FIG. 6A illustrates a plan view of an indoor space illustrating asset tag and mobile device trajectories as each may be presented on a display device to a user.

FIG. 6A illustrates a plan view of an indoor space illustrating asset tag and mobile device trajectories as each may be presented on a display device to a user.

The indoor space 600 may be a retail space such as that shown in FIG. 6A, but may also be a warehouse or the like. The indoor space 600 may be monitored with a positioning system (PS) 610, an asset tag location estimation system (LES) 620 and a backend server 630. The indoor space 600 may be subdivided into a grid such that locations, such as the "breakfast" items or entrance way 608, within the indoor space 600. The location information may be grid coordinates such as X, Y coordinates, or the like, that uniquely represent each location within the indoor space 600.

The backend server 630 may be coupled to database 633, and the PS 610 and LES 620. The database 633 may be used to store asset tag and mobile device trajectories and location information, association information and other information related to the asset tags and the mobile devices within the indoor space 600.

The PS 610 may include a processor, a memory and a communication interface (not shown in this example). The PS 610 may be coupled to a number of PS beacons 61 positioned throughout the indoor space 600 via the communication interface. The PS beacons 61 receive signals from mobile devices A-D (represented by uppercase letters enclosed in circles) within the indoor space. The PS 610 may determine, for example, a location of the mobile devices A-D via the signals, such as Bluetooth® signals, transmitted by the respective mobile device's signal communication with respective PS beacons 61 within the space 600.

The asset tag location estimation system (LES) 620 may include a processor, a memory and a communication interface (not shown in this example). The LES beacons 62 may receive signals from asset tags <a-d> (represented by lowercase letters enclosed in diamonds) located within the indoor space 600. The asset tags <a-d> may be coupled to assets within the indoor space 600. For example, asset tag <a> is coupled to asset 688, and asset 688 may be transportable by a user of mobile device A, or a person in close proximity to the user of mobile device A. By collecting location estimates for a tag associated with a particular asset over time, the asset tag location estimation system may track the position of the asset within the areas, for example, if the asset is moved within an area. In addition, the asset tag location estimation system may also determine that an asset has not moved for a predetermined period of time (e.g. 1 hour, 1 day).

FIG. 6B is a flowchart illustrating an example of a method performed by a system as described in FIG. 4. The steps of the process 601 shown in the flowchart of FIG. 6B will be explained with reference to the indoor space 600 of FIG. 6A. As a number of mobile devices enter the indoor space 600, a subset of the number of mobile devices may opt to use the indoor location system (PS) 610. For example, mobile devices A-D may have opted to use the PS. By opting to use the PS 610, the respective mobile devices A-D may have their location estimated by the PS 610. The estimated location information of the respective mobile devices A-D may be available to the backend server 630. Of the subset of mobile devices A-D using the PS, the back end server may select a user's mobile device for location estimation and asset tag monitoring. Each mobile device as it is detected by the PS 610 may be initially assigned either by the PS or the backend server a unique identifier such as A-Z that is not presently in use in the indoor space 600. Until the mobile devices provide additional information to the PS, such as affinity program user name information or the like, the mobile devices will be associated with the initially assigned unique identifier. The selection of the user may be made by the backend server 630 and may be arbitrarily based, for example, on the time (as determined by the backend server 630) at which the mobile device, such as mobile device A, began using the PS 610. For purposes of this example, the selected user is C and the selected user's mobile device is shown as the encircled uppercase letter C in FIB. 6A. The backend server 630 may obtain mobile device C location information from the PS 610. The obtained mobile device C location information may be stored in the database 633. At 641 of FIG. 6B, the backend server 630 may, for example, determine, in substantially real time utilizing the PS 610, movement of a selected user's mobile device C from one location to another location within an indoor space 600. Movement of the mobile device may be determined based on the PS 610 generating and providing updated location information of the PS to the backend server 630.

The backend server 630 may, for example, obtain from the PS 610 location information related to several different locations of the selected user's mobile device within the space 600. Using the several different locations, the backend server 630 at 642 may determine a trajectory of the selected user's mobile device C within the space 600 based on the movement of the selected user's mobile device determined at 641. The backend server 630 may obtain, at 643, asset tag location information of an asset coupled to an asset tag, such as asset tag <c>, in the space 600 from the asset tracking location estimation system 620 in the space 600. The location information may be grid coordinates such as X, Y coordinates, or the like, that uniquely represent each location within the space 600. The asset tag location estimation system 620 may be communicatively coupled to the respective asset tags <a>-<c>. Based on changes in the obtained asset tag location information within the space, a trajectory of the asset tag through the space may be determined. The asset tag location information provided by the asset tag location estimation may be include a number of different locations within the indoor space 600. For example, the asset tag location information may change as the asset and asset tag coupled to the asset are moved around the indoor space 600. The backend server may obtain the asset tag location information changes from the asset tag location estimation system 620.

Based on changes in the obtained location of the asset tag within the space the backend server may determine a trajectory of the asset tag(s) through the space 600 (644). The trajectory of the selected user may be compared to the trajectory of the asset tag (645). Based on a predetermined correspondence criteria, a correspondence between the selected user's mobile device trajectory and the asset tag trajectory may be determined (646). The predetermined correspondence criteria may include, for example, a predetermined physical proximity of the asset to the selected user's mobile device. The predetermined physical proximity may be based on a critical distance, such as Dcrit, corresponding to respective accuracies or resolutions of the asset tag location estimation system and the PS 610. For example, the asset tag location estimation system may have an accuracy to, or resolution of approximately 4-8 feet, while the PS 610 accuracy or resolution may be to 10s or 100s of centimeters. The determination of a correspondence between the selected user trajectory and the asset tag trajectory may indicate that the selected user is moving the asset.

In response to determining the correspondence, the asset may be associated with the selected user's mobile in a database. In some examples, the association of the asset (or the asset tag) to the selected user's mobile device may be the same as associating the asset tag to the selected user. The backend server 630 may associate the asset to the selected user's mobile device, in the database 633 by generating a database entry such as those shown in FIG. 6C containing a user identifier of the selected user and an asset identifier of the asset. The generated database entry may contain among other information, for example, a user identifier of the selected user and an asset identifier of the asset.

Using the associations, the backend server 630 may be configured to present the data in the database for presentation to a user. For example, the backend server 630 may be configured to generate data visualizations in the form of maps, tables of assets, tables of selected user's mobile devices, individual mobile devices with associated asset tags, or any other data visualization techniques or graphics (647). For example, the backend server 630 may generate a map of the space based on entries in the database and other information. The generated map may include indicators of locations of luminaires and lighting elements, indicators of the asset and other asset locations in the space simultaneously with an indicator of a location of a user in the space or other information.

FIG. 6C illustrates an example of a database entry that combines data obtained from an asset tag location estimate system used to monitor the location of and movement of assets and an positioning system that provides location services to mobile devices within the indoor space 600.

The sample of database 623 may include information obtained respectively from the PS 610 and the location estimation system 620. The database sample 623 may include a number of records 681 and 691. The records 681 may include information received from the PS 610. For example, entries 682 may indicate that the particular entries came from a specific system, such as the PS system, entries 683 may indicate the particular user that the entry is referencing, entries 684 may indicate the time that the particular entry was generated, and entries 685 may indicate the location (as X, Y coordinates) of the respective user's mobile device within the space. Similarly, the database sample may include the records 691 that may include information received from asset tag location estimation service. For example, entries 692 may indicate that the particular entries came from the asset tag location estimation system (labeled as RFID); entries 693 may indicate the asset that the entry is referencing; entries 694 may indicate the time that the particular entry was generated; and entries 695 may indicate the location (as X, Y coordinates) of the respective asset within the indoor space 600. Entry 696 is an indicator of whether the asset is moving (Y) or stationary (N) (not shown).

Entries 686 may be identifiers of the assets being carried by the respective users identified in respective records #1-8 of entries 681 as determined by the process 601 discussed above with respect to FIGS. 6A and 6B. The entries 697 are identifiers of the users that are carrying respective assets identified in respective records #101-106 as determined by the process 601 discussed above with respect to FIGS. 6A and 6B.

The PS 610 and the location estimation system 620 may have different resolutions. For example, the PS 610 may implement a Bluetooth Low Energy-based location service that may have a greater resolution (e.g. 10s of centimeters) as compared to the location estimation system 620 (e.g. RFID—5 feet resolution). As a result, the location entries 685 and 695 may be normalized to a gird coordinate suitable for ascertaining respective asset tag trajectories and selected user's mobile device trajectories. The sample database 623 may include additional data such as a user identifier of the selected user, such as A which is also representative of the selected user's mobile device, and an asset identifier, such as <a> of the asset.

The representative data in the sample 623 may be advantageous for a variety of reasons such as determining a trajectory of an asset based on changes in the obtained real time location of the asset within the space; real-time data of the movement of an asset. The user's mobile device is used as an example of a user in the following discussion of FIG. 7, but it should be understood that a user might be tracked as discussed above instead of, or in addition to, a user's mobile device.

Figure 7:
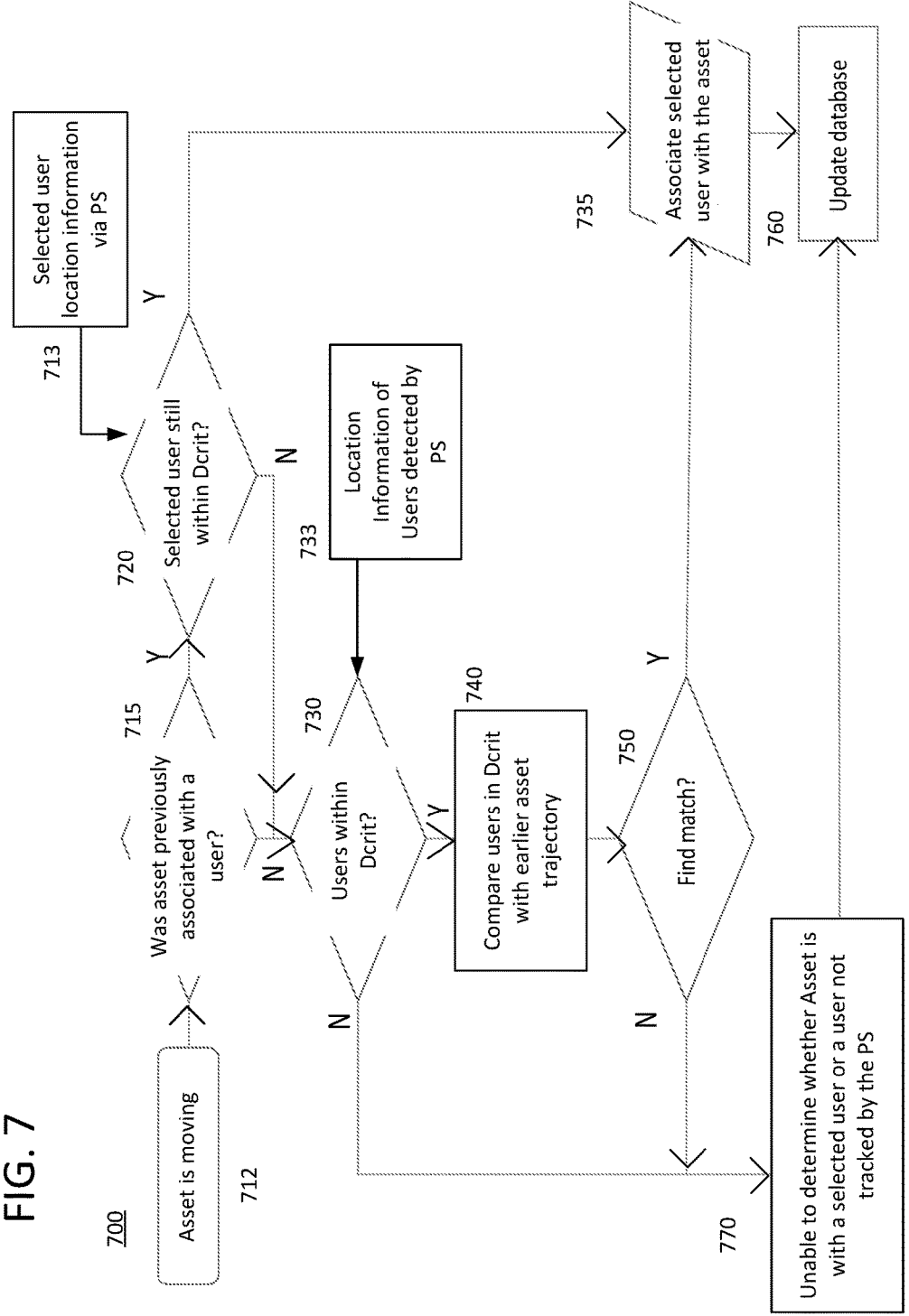
FIG. 7 illustrates a flowchart of an example process for tracking a moving asset with respect to movement of a mobile device.

In the example of FIG. 7, the process 700 for tracking movement of an asset may include a backend server that performs the various process steps. For example, the backend server may obtain asset tag location information of an asset coupled to an asset tag in the space from the asset tag location estimation system. Based on the obtained asset tag location information of an asset, the backend server may determine that the asset coupled to the asset tag is moving (712). As discussed in the earlier examples, the asset tag location estimation system is communicatively coupled to the asset tag via, for example, an RFID communication system. The backend server may, at 715, determine whether the asset was previously associated with a user's mobile device. For example, the backend server may access a database or a lookup table in which may be stored an asset tag identifier a corresponding mobile device, and/or other information related to the asset tag, the corresponding mobile device, the asset, the space, and/or the mobile device user. If the determination at 715 is yes, the asset was previously associated with a user's mobile device, the previously associated user's mobile device may be referred to as the selected user's mobile device. The process 700 proceeds to 720 at which the backend server determines whether the selected user's mobile device and the asset are within a critical distance Dcrit of one another.

The critical distance, Dcrit, is an approximate distance between the asset and a mobile device that is used as a threshold distance for associating a mobile device with an asset, or vice versa. If the approximate distance between a mobile device and an asset is greater than (>) Dcrit, the mobile device is not a candidate for being associated with the asset. For example, if the asset is an item of merchandise in a retail setting or a laptop computer in an office setting, the user of the mobile device is not carrying the asset if the approximate distance between a mobile device and an asset is greater than (>) Dcrit.

The critical distance Dcrit is a function of the resolution of the asset tracking location estimate system and the PS system. In general, the resolution of asset tracking location estimate system may be lower resolution than the resolution of the PS system used to locate the mobile device. In some examples, the distance Dcrit may be approximately 5 feet or greater. Of course, a smaller Dcrit distance is better, and some asset tag location estimation systems may enable the distance Dcrit to be less than the approximate 5 feet. For example, a location estimation system that utilizes frequencies in the ultra-wide band may enable the distance Dcrit to be less than approximately 5 feet.

Returning to the determination at 720 of whether the selected user's mobile device and the asset are within a critical distance Dcrit of one another, the backend server may obtain the selected user's mobile device location information from the PS (713).

Using the asset tag location information and the selected user's mobile device location information, the backend server may use multiple location indications of the mobile device as provided by the PS and of the asset tag as provided by the asset tag location estimation system to develop a respective trajectory (as described above) of both the asset tag and the selected user's mobile device within the space. Based on an analysis of the respective trajectories and Dcrit, the backend server may make a determination that the selected user's mobile device and the asset tag are within Dcrit of one another for a substantial part of the developed trajectories. A substantial part of the developed trajectory may be, for example, over a distance of approximately 10 feet, or the approximate distance between two adjacent nodes or luminaires within a space, or other similar approximate distances. The estimated distance between the selected user's mobile device and the asset tag over the developed trajectory may at least be equal to or less than Dcrit for approximately 10 feet of the respective trajectories. In other words, if the trajectories for both the selected user's mobile device and the asset tag covered 30 feet, the backend server using approximately 10 feet as a threshold may determine that the asset tag and the selected user's mobile device were within Dcrit for the approximately 10 feet of the developed trajectories. Because of the determination by the backend server at 720 that yes, the asset tag and the selected user's mobile device are within Dcrit of one another, the process 700 continues to 735. At 735, the backend server may associate the selected user's mobile device with one another, and the database or look up table at 760 is updated.

Returning to 715 and 720, if the determination at either 715 of 720 is No, the process 700 proceeds to 730. At 730, the backend server may receive location information of mobile devices detected by the PS, and using the received mobile device location information, may identify mobile devices that are within Dcrit of the asset tag. If there are no mobile devices within Dcrit of the asset tag, the process 700 proceeds to 770. At 770, the backend server is unable to determine whether the asset is associated with a selected user's mobile device or a user not being tracked by the PS. After 770, the backend server updates the database that the asset is not associated with a selected user's mobile.

Alternatively at 730, if the backend server determines based on the mobile device location information received from the IP that there are a number of mobile devices within Dcrit of the asset, the process 700 may progress to 740. At 740, the backend server may compare trajectories of mobile devices within Dcrit of the asset to an earlier asset tag trajectory. The backend server may, for example, maintain a database of asset trajectories for a period of time, such as 12-24 hours or the like, or until the asset is no longer in the space, such as when the asset is an inventory asset in a retail or a warehouse example. The backend server may compare the trajectories of the mobile devices with the earlier asset tag trajectory by applying a best-fit function, such as a least squares fitting algorithm, geometric, polynomial or the like. Alternatively, the backend server may compare the trajectories of the respective user or user's mobile devices with the earlier asset tag trajectory using a distance traveled or time traveled by the respective mobile devices and the asset while maintaining a proximity to one another within the critical distance Dcrit, or the like. The respective distance traveled may be ten (10) feet or the like, and the time may be 1-5 minutes or some other period. Alternatively, a combination of distance traveled and time while maintaining a proximity to one another within the critical distance Dcrit may be used during the comparison. As a part of the process at step 740, the backend server may update the asset tag trajectory and the user trajectory, and confirm, based the predetermined correspondence criteria, the correspondence between the asset tag and the selected user's mobile device based on the updated asset tag trajectory and the updated selected user's mobile device trajectory.

As part of the comparison at 740, the backend server may generate a mobile device trajectory for all mobile devices within Dcrit of the asset until a small number mobile devices, such as one (1) or two (2) remain. The backend server may continue to monitor the trajectory of the mobile devices and the asset's earlier trajectory to determine if there is a match at 750. If there is a match between trajectories of one of the mobile devices identified in 740 and the earlier asset, the process 700 transfers from 750 to 735. At 735, the backend server may select the user's mobile device for association with the asset, and the process transitions to 760 at which the backend server updates the database with the association.

If multiple mobile devices continue to be associated with the same asset after a set time (e.g. ten minutes), each of the multiple mobile devices are associated with the asset until the process 700 determines that the mobile device is no longer associated with the asset.

If no mobile device is determined to have as trajectory matching the asset tag trajectory, the asset may be carried by a user whose mobile device is not using or not being tracked by the PS.

Figure 8:
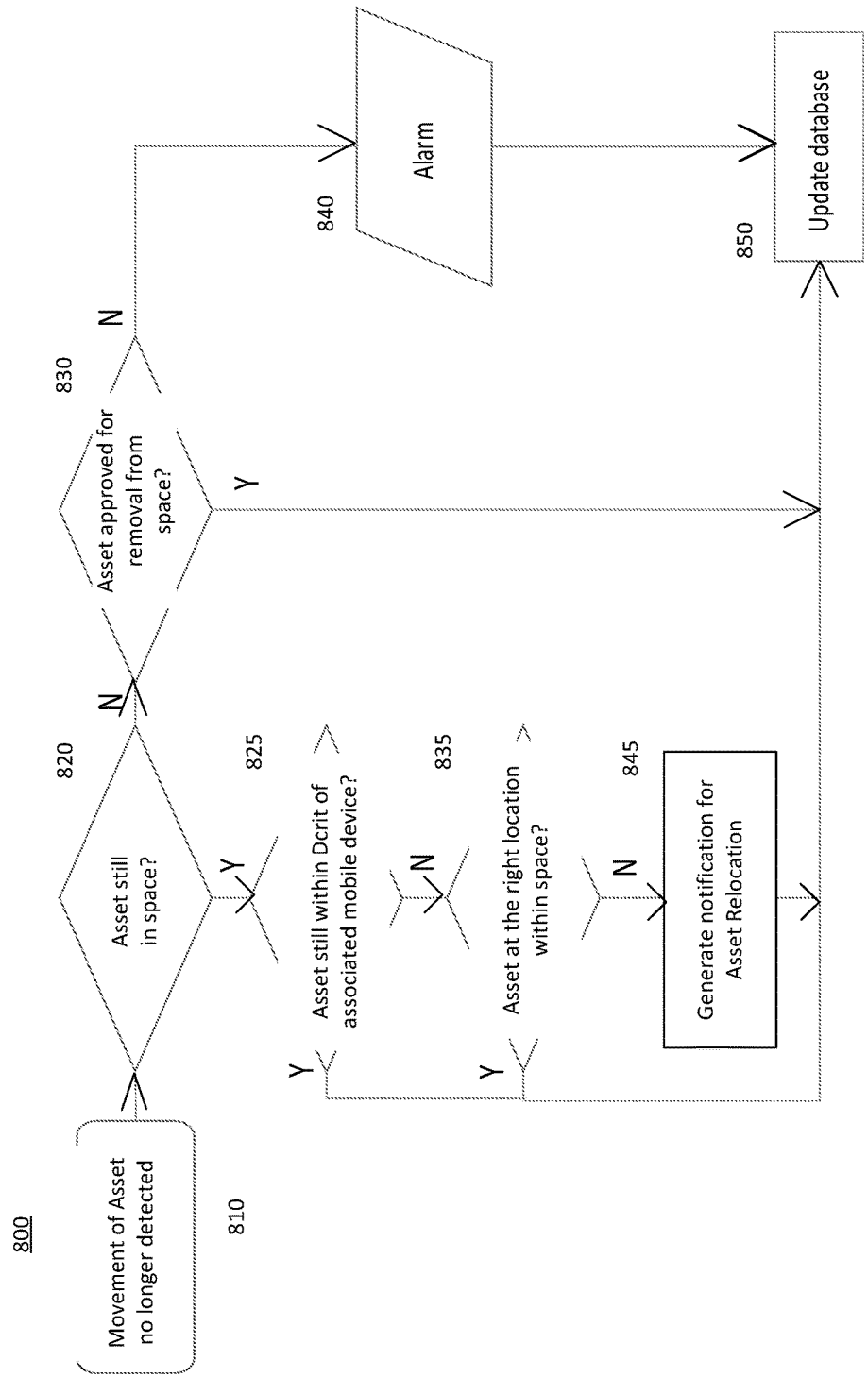
FIG. 8 illustrates a flowchart of an example process for confirming whether an asset is no longer moving and/or is determined to correspond to a mobile device.

FIG. 8 provides another flowchart of an example of a process in which an asset was previously determined to be moving but has stopped moving or is no longer detected by the asset tracking location estimation service.

In the process 800, the asset tag location estimate outputs a location estimate of an asset tag coupled to an asset. The outputted location estimate may be received by the backend server. The backend server may determine that the estimated location of the asset tag has not changed from an earlier estimated location for a predetermined period of time. As a result of the determination by the backend server that the asset tag has not moved for a period of time, the backend server may indicate that the asset tag is no longer moving (810). In response, the process 800 proceeds to 820. At 820, the backend server determines whether the estimated location of the asset tag is still within the space. If backend server determines the asset tag is not within the space based on the asset tag's estimated location, the process proceeds to 830. At 830, the backend server may access the database to determine whether the asset coupled to the asset tag is authorized for removal from the space. If the asset is not authorized for removal from the space, the backend server may initiate an alarm (840). For example, the backend server may notify security personnel of the asset's removal from the space, sound an alarm siren or light, or notify another system that initiates an asset recovery process or, if the asset is an electronic device, a shutdown process. After initiating the alarm, the process 800 may proceed to 850 at which the backend server may update the database to indicate that the asset in not in the space and that the alarm has been initiated. For example, the backend server may update the database to indicate that the recovery process has been started.

Alternatively, at 820, the backend server may determine based on the asset tag's estimated location that the asset tag is still within the space. As a result, the process 800 may proceed to 825, where a determination is made whether the asset is still within the critical distance Dcrit of an associated mobile device. This determination may be made using a process similar to the comparison of step 740 of FIG. 7. If the backend server determines at 825 that the asset is still within Dcrit of the associated mobile device, the process 800 proceeds to 850. At 850, the backend server updates the database that the non-moving asset is associated with the mobile device. Alternatively, if the backend server determines at 825 that the asset is not within Dcrit of the associated mobile device, the process 800 may proceed to 835.

At 835, the backend server may access a database and use the asset tag's estimated location to determine whether the asset is at the right location within the space. The right location may be a location within the space at which the asset is kept, stored, warehoused, shelved or the like within the space. If the backend server determines the asset is at the right location at 835, the process 800 proceeds to 850. At 850, the backend server updates the database that the non-moving asset is at the right location. Alternatively, if at 835, the backend server determines the asset is not at the right location, the backend server may generate a notification for the asset to be relocated to the asset's right location (845). The general notification may be an alert output by the backend server that notifies via a text message to a stock clerk's portable device to re-shelve the asset to the asset's right location, or via a signal to an automated stacking or transporting machine to place the asset with like assets in a warehouse or distribution facility, or the like. After the general notification is output, the backend server may update the database that a general notification for relocation of the asset to the asset's right location was generated (850).

FIGS. 9 and 10 provide functional block diagram illustrations of general purpose computer hardware platforms. FIG. 9 illustrates a network or host computer platform, such as 140 of FIG. 1, as may typically be used to implement a server or a system such as backend server application 146 of FIG. 1, PS 610 or LES 620 or FIGS. 6A and 6B. FIG. 10 depicts a computer with user interface elements, as may be used to implement a personal computer or other type of work station or terminal device, although the computer of FIG. 10 may also act as a server if appropriately programmed. It is believed that those skilled in the art are familiar with the structure, programming and general operation of such computer equipment and as a result, the drawings should be self-explanatory.

Hardware of a server computer, for example (FIG. 9), includes a data communication interface for packet data communication. The server computer also includes a central processing unit (CPU), in the form of circuitry forming one or more processors, for executing program instructions. The server platform hardware typically includes an internal communication bus, program and/or data storage for various programs and data files to be processed and/or communicated by the server computer, although the server computer often receives programming and data via network communications. The hardware elements, operating systems and programming languages of such server computers are conventional in nature, and it is presumed that those skilled in the art are adequately familiar therewith. Of course, the server functions may be implemented in a distributed fashion on a number of similar hardware platforms, to distribute the processing load.

FIG. 10 depicts a computer with user interface elements, as may be used to implement a portable device or other type of work station or terminal device, although the computer of FIG. 10 may also act as a server if appropriately programmed. Hardware of a computer type user terminal device, such as a PC or tablet computer, may include a data communication interface, CPU, main memory and one or more mass storage devices for storing user data and the various executable programs (see FIG. 10). A mobile device (FIG. 11) type user terminal may include similar elements, but will typically use smaller components that also require less power, to facilitate implementation in a portable form factor. Mobile device 227 of FIG. 4 may be configured in a manner similar to that shown in FIG. 11. It is believed that those skilled in the art are familiar with the structure, programming and general operation of such computer equipment and as a result the drawings should be self-explanatory. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphone type mobile devices include similar but smaller input and output elements. Tablets and other types of smartphone type mobile devices utilize touch sensitive display screens, instead of separate keyboard and cursor control elements. In the example (FIG. 11), the mobile device may be configured to receive the asset tag location estimate for presentation of the estimated location to a user via a touch screen display of the mobile device. The hardware elements, operating systems and programming languages of such user terminal devices also are conventional in nature, and it is presumed that those skilled in the art are adequately familiar therewith.

Hence, aspects of the methods receiving signals, processing the received signals and generating and processing data for tracking location of an asset tag and location data of a user's mobile device in a space outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming and/or the relevant data. All or portions of the software and/or the relevant data may at times be communicated through the Internet, telecommunication networks, or various other data networks. Such communications, for example, may enable loading of the programming and the database from one computer or processor into another, for example, from a management server or host computer of an enterprise location, or more generally, the location determination or estimation service provider into the computer platform and on-line to perform the relevant server functions in an actual working environment. Thus, another type of media that may bear the software elements and data includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that includes the element.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Thus the following claims are hereby incorporated into the Detailed Description, with each claim standing on its own as a separately claimed subject matter.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. For example, unless expressly stated otherwise, a parameter value or the like may vary by as much as ±10% from the stated amount.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including,"

or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system, comprising:
   a radio frequency-enabled asset tag location estimation system configured to track location of a radio frequency (RF)-enabled asset tag within a space, wherein the RF-enabled asset tag is coupled to an asset within the space;
   a positioning system configured to determine a location of a selected user within the space, wherein the positioning system is an RF based communication system configured to exchange RF signals with a mobile device of the selected user and determine the location of the mobile device as the location of the selected user based on the exchanged RF signals; and
   a backend server coupled to the asset tag location estimation system and the positioning system, the backend server configured to:
      receive asset tag location information from the asset tag location estimation system corresponding to the RF-enabled asset tag within the space;
      receive user location information of the selected user from the positioning system;
      determine locations of the RF-enabled asset tag within the space based on the asset tag location information provided by the asset tag location estimation system;
      determine a trajectory of the RF-enabled asset tag through the space based on the determined locations of the RF-enabled asset tag within the space;
      receive updated user location information of the selected user from the positioning system;
      determine a trajectory of the selected user through the space based on the received user location information and the received updated user location information;
      determine, based on a predetermined correspondence criteria, a correspondence between the selected user's trajectory and the RF-enabled asset tag trajectory, wherein determination of the correspondence indicates that the selected user and the RF-enabled asset tag are traveling through the space within a critical distance of one another; and
      in response to determining the correspondence, associating the RF-enabled asset tag to the selected user in a database.

2. The system of claim 1, wherein the back end server is further configured to:
   associate the selected user to a mobile device identified as being the user's mobile device; and
   associate the asset to the selected user in the database.

3. The system of claim 1, wherein determining the correspondence between the RF-enabled asset tag trajectory and the selected user trajectory comprises:
   determining that the asset is within a predetermined physical proximity of the selected user.

4. The system of claim 3, wherein the predetermined physical proximity is based on a critical distance corresponding to an accuracy of the asset tag location estimation system and the positioning system.

5. The system of claim 1, wherein associating the asset to the selected user in a database comprises:
   identifying the mobile device of the selected user; and
   generating a database entry containing a mobile device identifier of the mobile device of the selected user and an asset identifier of the asset.

6. The system of claim 1, further comprising:
   generating a map of the space based on information in the database related to locations of luminaires and lighting elements, indicators of the asset and other asset locations in the space simultaneously with an indicator of the selected user location in the space.

7. The system of claim 1, further comprising:
   updating the asset tag trajectory and the selected user's trajectory; and
   confirming, based the predetermined correspondence criteria, the correspondence between the asset and the selected user based on the updated asset tag trajectory and the updated selected user's trajectory.

8. The system of claim 7, further comprising:
   in response to a confirmation that the correspondence between the asset tag trajectory and the updated selected user's trajectory, maintaining the association of the asset to the selected user in the database.

9. The system of claim 7, further comprising:
   in response to a confirmation that the moving asset tag trajectory and the updated selected user's trajectory no longer correspond, disassociating the assignment of the asset to the selected user in the database.

10. The system of claim 7, further comprising:
    in response to the confirmation that the asset tag trajectory and the updated selected user's trajectory no longer correspond, confirm that the asset is at an assigned location for the asset within the space.

11. The system of claim 7, further comprising:
    in response to the confirmation that the RF-enabled asset tag trajectory and the user trajectory no longer correspond, confirm that the asset is within the space using updated asset tag location information received from the asset tag location estimation system.

12. The system of claim 7, further comprising:
in response to an indication that the asset tag is outside the space, generating an alarm signal indicating that the asset is outside the space.

13. A method, comprising:
determining, in substantially real time utilizing a positioning system, movement of a selected user's mobile device from one location to another location within a space;
determining a trajectory of the selected user's mobile device within the space based on the determined movement of the selected user;
obtaining asset tag location information of an asset coupled to an asset tag in the space from an asset tag location estimation system in the space, wherein the asset tag location estimation system is communicatively coupled to the asset tag;
determining a trajectory of the asset tag through the space based on changes in the obtained location of the asset tag within the space;
comparing the trajectory of the selected user's mobile device to the trajectory of the asset tag;
determining, based on a predetermined correspondence criteria, a correspondence between the selected user's mobile device trajectory and the asset tag trajectory, wherein determination of a correspondence indicates that the selected user's mobile device is a corresponding mobile device that is moving with the asset; and
in response to determining the correspondence, associating the asset with the corresponding mobile device in a database.

14. The method of claim 13, wherein determining the correspondence between the asset tag trajectory and the user trajectory comprises:
determining that the asset is within a predetermined physical proximity of the corresponding mobile device, wherein the predetermined correspondence criteria includes the predetermined physical proximity.

15. The method of claim 14, wherein the predetermined physical proximity is based on a critical distance corresponding to respective accuracies of the asset tag location estimation system and the positioning system.

16. The method of claim 13, wherein associating the asset to the corresponding mobile device in a database comprises:
generating a database entry containing a user identifier of the corresponding mobile device and an asset identifier of the asset.

17. The method of claim 13, further comprising:
presenting data in the database entry for presentation to a user.

18. The method of claim 17, wherein the presenting of the data comprises:
generating a map of the space based on the database entry and other information within the database, the generated map including graphical indicators of locations of luminaires and lighting elements, indicators of the asset and other asset locations in the space simultaneously with an indicator of a location of a user in the space.

19. The method of claim 13, further comprising:
updating the asset tag trajectory;
determining a trajectory of corresponding mobile device trajectory; and
confirming, based the predetermined correspondence criteria, the correspondence between the asset and the corresponding mobile device based on the updated asset tag trajectory and the corresponding mobile device trajectory.

20. The method of claim 19, further comprising:
in response to a confirmation of the correspondence between the asset tag trajectory and the corresponding mobile device trajectory, maintaining the association of the asset to the selected user's mobile device in the database.

21. The method of claim 19, further comprising:
in response to a confirmation that the asset tag trajectory and the corresponding mobile device trajectory no longer correspond, disassociating the assignment of the asset to the user in the database.

22. The method of claim 19, further comprising:
in response to the confirmation that the asset tag trajectory and the corresponding mobile device trajectory no longer correspond, confirm that the asset tag is at an assigned location for the asset tag within the space.

23. The method of claim 19, further comprising:
in response to the confirmation that the asset tag trajectory and the corresponding mobile device trajectory no longer correspond, determine whether the asset tag is within the space.

24. The method of claim 23, further comprising:
in response to a determination that the asset tag is outside the space, generating an alarm signal indicating the asset tag is outside the space.

25. A system, comprising:
an asset tag location estimation and positioning system including at least one radio frequency (RF) transceiver configured for communication with at least one RF-enabled tag, the estimation system configured to:
based on receiving RF signals from the RF-enabled asset tag, track a location of the asset tag within a space; and
based on signals obtained from automatically detecting a selected user, determine a location of the selected user within the space; and
a backend server coupled to the asset tag location estimation and positioning system, the backend server configured to:
receive asset tag location information from the estimation and positioning system corresponding to the RF-enabled asset tag within the space;
receive location information of the selected user from the estimation and positioning system;
determine locations of the RF-enabled asset tag within the space based on the asset tag location information provided by the estimation and positioning system;
determine a trajectory of the RF-enabled asset tag through the space based on the determined locations of the RF-enabled asset tag within the space;
receive updated location information of the selected user from the estimation and positioning system;
determine a trajectory of the selected user through the space based on the received location information of the selected user and the received updated location information of the selected user;
determine, based on a predetermined correspondence criteria, a correspondence between the selected user's trajectory and the RF-enabled asset tag trajectory, wherein determination of a correspondence indicates that the selected user and the RF-enabled asset tag are traveling through the space within a critical distance of one another; and
in response to determining the correspondence, associate the RF-enabled asset tag to the selected user in a database.

26. The system of claim 25, wherein:

the at least one RF transceiver includes an RF transceiver configured to generate the signals obtained from automatically observing the selected user, based on an exchange of signals with a mobile device of the selected user; and the backend server is configured to implement the association in the database by associating the RF-enabled asset tag to the mobile device of the selected user.

\* \* \* \* \*